US012476980B2

(12) United States Patent
Ravichandran et al.

(10) Patent No.: US 12,476,980 B2
(45) Date of Patent: Nov. 18, 2025

(54) SECURE MONITORING FOR TRUSTED/UNTRUSTED NETWORK NODE ACCESS IN CLOUD-BASED TELECOMMUNICATION AND ENTERPRISE NETWORK

(71) Applicant: RAKUTEN MOBILE, INC., Tokyo (JP)

(72) Inventors: Bharath Kumar Ravichandran, Tokyo (JP); John Carse, Tokyo (JP); Pradheepkumar Singaravelu, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/010,675

(22) PCT Filed: Sep. 30, 2022

(86) PCT No.: PCT/US2022/045307
§ 371 (c)(1),
(2) Date: Dec. 15, 2022

(87) PCT Pub. No.: WO2023/214987
PCT Pub. Date: Nov. 9, 2023

(65) Prior Publication Data
US 2024/0106826 A1  Mar. 28, 2024

Related U.S. Application Data

(60) Provisional application No. 63/339,108, filed on May 6, 2022, provisional application No. 63/338,532, filed (Continued)

(51) Int. Cl.
*H04L 9/40* (2022.01)

(52) U.S. Cl.
CPC .............. *H04L 63/108* (2013.01); *H04L 9/40* (2022.05); *H04L 63/08* (2013.01);
(Continued)

(58) Field of Classification Search
CPC ... G06F 21/577; G06F 21/44; H04L 63/1433; H04L 9/0894; H04L 9/40; H04L 63/102;
(Continued)

(56) References Cited

U.S. PATENT DOCUMENTS

| 7,873,996 B1* | 1/2011 | Emigh | H04L 51/212 726/22 |
| 2013/0109356 A1* | 5/2013 | Patterson | H04M 3/436 455/411 |

(Continued)

OTHER PUBLICATIONS

International Search Report dated Jan. 31, 2023 from the International Searching Authority in International Application No. PCT/US2022/045307.

(Continued)

*Primary Examiner* — Mohammad A Siddiqi
(74) *Attorney, Agent, or Firm* — Sughrue Mion, PLLC

(57) ABSTRACT

Provided are a method, system, and computer-readable recording medium for registering a node in a zero trust remote access system. The method includes: receiving a request to subscribe a node to a zero trust remote access system for a network; generating a subscription identification (ID) for the node based on one or more parameters of the node; configuring the node with security logging; initiating a service of the node based on a trust percentage calculated for the node according to a security configuration of the node; and receiving security logs from the node based on the configured security logging.

18 Claims, 34 Drawing Sheets

Related U.S. Application Data on May 5, 2022, provisional application No. 63/338,570, filed on May 5, 2022.

(52) U.S. Cl.
CPC ........ *H04L 63/0892* (2013.01); *H04L 63/101* (2013.01); *H04L 63/102* (2013.01); *H04L 63/1433* (2013.01)

(58) Field of Classification Search
CPC ..... H04L 63/108; H04L 63/101; H04L 63/08; H04L 63/0892; H04L 67/34
See application file for complete search history.

(56) References Cited

U.S. PATENT DOCUMENTS

| | | | |
|---|---|---|---|
| 2016/0197873 A1* | 7/2016 | Alghamdi | H04L 51/52 709/206 |
| 2019/0026450 A1* | 1/2019 | Egner | G06F 21/44 |
| 2021/0320797 A1* | 10/2021 | Koorella | H04L 9/50 |
| 2021/0336959 A1* | 10/2021 | Shah | H04L 63/0281 |
| 2022/0046038 A1* | 2/2022 | Sinha | G06F 11/3072 |
| 2022/0108315 A1* | 4/2022 | Gorog | H04L 9/0827 |
| 2024/0106833 A1* | 3/2024 | Ravichandran | H04L 9/0894 |
| 2024/0236111 A1* | 7/2024 | Ravichandran | G06F 21/577 |

OTHER PUBLICATIONS

Written Opinion dated Jan. 31, 2023 from the International Searching Authority in International Application No. PCT/US2022/045307.

* cited by examiner ate or not, and classifying the target node into an internal untrusted node, an external trusted node, or an untrusted node. As a result, an additional layer of security to prevent abuse by any intruders or any malicious application.

According to example embodiments, a method of registering a node for zero trust remote access in a network system, includes: receiving a request to subscribe a node to a zero trust remote access system for a network; generating a subscription identification (ID) for the node based on one or more parameters of the node; configuring the node with security logging; initiating a service of the node based on a trust percentage calculated for the node according to a security configuration of the node; and receiving security logs from the node based on the configured security logging.

According to example embodiments, a zero trust remote access system for configuring nodes for zero trust access in a network, includes: at least one memory storing instructions; and at least one processor configured to execute the instructions to: receive a request to subscribe a node to a zero trust remote access system for a network, generate a subscription identification (ID) for the node based on one or more parameters of the node, configure the node with security logging, initiate a service of the node based on a trust percentage calculated for the node according to a security configuration of the node, and receive security logs from the node based on the configured security logging.

According to example embodiments, a non-transitory computer-readable recording medium has recorded thereon instructions executable by at least one processor to perform a method of registering a node for zero trust remote access in a network system, the method including: receiving a request to subscribe a node to a zero trust remote access system for a network; generating a subscription identification (ID) for the node based on one or more parameters of the node; configuring the node with security logging; initiating a service of the node based on a trust percentage calculated for the node according to a security configuration of the node; and receiving security logs from the node based on the configured security logging.

Additional aspects will be set forth in part in the description that follows and, in part, will be apparent from the description, or may be realized by practice of the presented embodiments of the disclosure.

SECURE MONITORING FOR TRUSTED/UNTRUSTED NETWORK NODE ACCESS IN CLOUD-BASED TELECOMMUNICATION AND ENTERPRISE NETWORK

CROSS-REFERENCE TO RELATED APPLICATION(S)

This application is a National Stage of International Application No. PCT/US2022/045307 filed on Sep. 30, 2022, which is based on and claims priority from U.S. Provisional Patent Application No. 63/338,532, filed on May 5, 2022, U.S. Provisional Patent Application No. 63/338,570, filed on May 5, 2022, and U.S. Provisional Patent Application No. 63/339,108, filed on May 6, 2022 in the United States Patent and Trademark Office, the disclosures of which (and the disclosures of the PCT applications filed concurrently herewith and claiming benefit thereof) are incorporated by reference herein in their entireties. That is, the disclosures of the other PCT applications filed Sep. 30, 2022 and claiming priority from U.S. Provisional Patent Application No. 63/338,570, U.S. Provisional Patent Application No. 63/338,532 and U.S. Provisional Patent Application No. 63/339,108 are also incorporated by reference in their entireties.

BACKGROUND

1. Field

Apparatuses and methods consistent with example embodiments of the present disclosure relate to a security system and method for a cloud-based telco network system, and more particularly to methods and procedures for secure monitoring of trusted and untrusted network node access.

2. Description of Related Art

Recently, telecommunication network systems have been undergoing a transformation from a hardware-based system to a virtualized, software-based system or cloud system. Although security for cloud systems may have been undergoing development in the past decade, the security aspect for cloud-based telco network systems remains a relatively new area for exploring and enhancement.

Generally, a network system allows a node to connect to another node (e.g., a target node). In related art telecommunications and cloud security systems and procedures, there is no way to determine or classify the nodes within a network based on the type of the node. Lacking a way to determine/classify the type of the node causes security issues and risks in cloud-based telco network system, such as (but not limited to) the following: (a) Distributed Denial of Service (DDoS) attacks on centralized data plane gateways; (b) exploitation of multiple cloud nodes with a single vulnerability; (c) zero-day exploits to gain access and control all cloud network nodes; (d) lateral movement of zero-day attacks and DDoS attacks; and (e) supply chain attacks in internal code repositories, images, data at rest, etc.

SUMMARY

According to embodiments, systems and methods are provided for including a zero trust-remote access system (ZTRAS) to control target node access by validating whether a user request for accessing a target node is legiti-

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
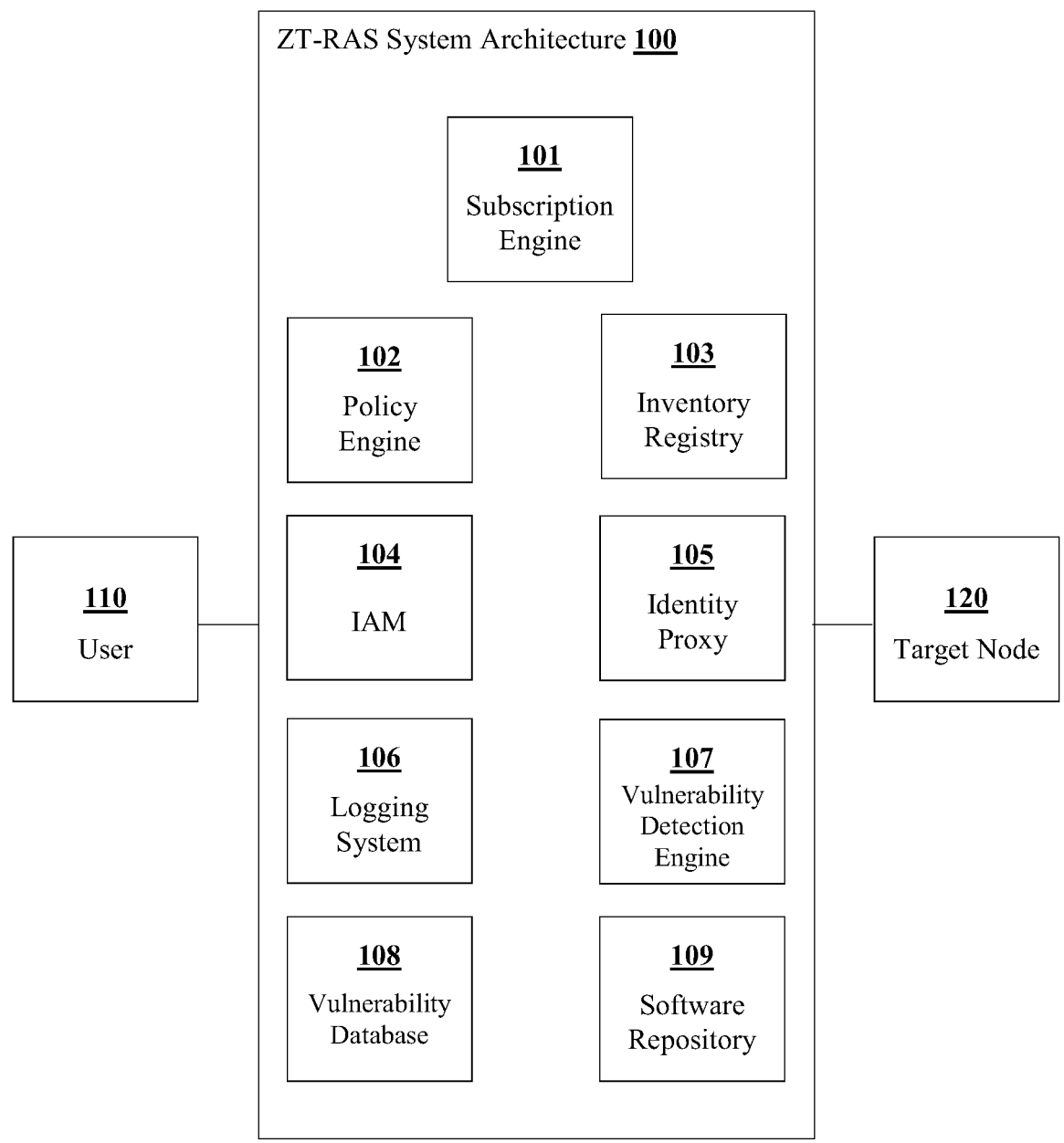
FIG. 1 illustrates a system architecture of a zero trust-remote access system (ZTRAS) for providing network access from a user to a target node in a network, in accordance with an example embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are disclosed herein, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As set forth above, example embodiments of the present invention provide systems and methods for including a zero trust-remote access system (ZTRAS) to control user access to a target node in a network. Specifically, the ZTRAS validates whether a user request for accessing a target node is legitimate, and/or classifies the target node into one of plural different types (e.g., internal trusted node, external trusted node, or untrusted node).

The ZTRAS according to example embodiments is a centralized boundary-less identity and access management system based on authentication request attributes, context, identity, and network policies that validate any type of adversary connection request as legitimate or illegitimate from any untrusted or trusted network. The solution provides an additional layer of security to prevent abuse by any intruders or any malicious application.

The ZTRAS subscription engine (which may include a processing engine and any other suitable elements) according to example embodiments validates whether a user request for accessing a target node is legitimate or not, and/or classifies the target node as an internal trusted node, external trusted node, or untrusted node. The ZTRAS according to example embodiments ensures the nodes in the network are subscribed to the system with a unique identifier based on trust validation for the node and a trust percentage value. This provides a unique context to the node enabling centralized monitoring, visibility, and detection for adversary requests to any network node in the cloud-based telecommunication and enterprise network. Accordingly, example embodiments provide a novel approach and process for classifying the target node to which access is requested.

The ZTRAS according to example embodiments ensures the nodes in the network are subscribed to the system with a unique identifier based on trust validation for the node and a trust percentage value. This provides a unique context to the node enabling centralized monitoring, visibility, and detection for adversary requests to any network node in the cloud-based telecommunication and enterprise network.

By determining the type of the network node and generating a unique subscription identifier for every node in the telecommunication and/or enterprise network, systems and methods according to one or more embodiments achieve one or more of the following technical benefits: (1) prevention of Distributed Denial of Service (DDoS) on centralized data plane gateways by detecting and tracking incoming requests from malicious IPs; (2) detecting exploitation of multiple cloud nodes with a common vulnerability; (3) detecting zero-day exploits by identifying affected nodes via unique node subscription identifier; (4) detecting lateral movement of zero-day attacks and DDoS attacks by monitoring the security logs and the audit logs and configuring dynamic alerts; and (5) preventing supply chain attacks in internal code repositories, images, data at rest, etc.

In accordance with one or more example embodiments, a node (or target node) as described herein may be classified as a virtualized network function (VNF), an application, a cloud-native network function (CNF), a cluster, a host, a physical node, an endpoint, or any potential element in the network system. Further, each node is assigned a unique subscription identifier $ZTRAS_{nodeid}$ which shall be classified as $ZTRAS_{Tnodeid}$, $ZTRAS_{Anodeid}$, ZTRAS Rnodeid based on the type of the target node. Without the ZTRAS node subscription ($ZTRAS_{nodeid}$), service will not be initialized for the target node. Further, in example embodiments, inventory registry is mandatory for all trusted nodes.

As used herein, a $ZTRAS_{id}$ (ZTRAS ID or telco operator ZTRAS ID) is as unique identifier provisioned for users of or attempting access to the network system, such as employee/operator/contractor/sales/marketspace/customer based on existing user identities such as public, private, corporate accounts, etc.

An inventory registry in one or more example embodiments shall have all mandatory information of at least internal trusted nodes and external trusted nodes, respectively. For internal trusted nodes (e.g., nodes such as those provided or authorized by the network operator), at least one of the following information may be mandatory (though the information in the registry is not limited thereto): Internet protocol address (IP), Hostname, fully qualified domain name (FQDN), application name, namespace, cluster ID, endpoints, Media Access Control (MAC) address, location, universally unique identifier (UUID), serial number, equipment type, identity management integrated, secrets management integrated, centralized logging integrated, internal certificate details, etc. This information may be provided during registration of ZTRAS subscription for the trusted nodes.

For external trusted nodes (e.g., nodes such as those provided by vendors or service providers to the telco network system), at least one of the following information may be mandatory for the inventory registry (though the information in the registry is not limited thereto): IP, FQDN, endpoints, location, UUID, serial number, equipment type, public (or third-party) certificate details.

ZTRAS identity and access management (IAM) according to one or more example embodiments is a centralized IAM solution that supports authentication protocols such as, but not limited to, Lightweight Directory Access Protocol (LDAP), Remote Authentication Dial-In User Service (RADIUS), Terminal Access Controller Access-Control System (TACACS), OpenID Connect (OIDC), Open Authorization 2 (OAUTH2), etc.

A ZTRAS subscription engine according to one or more example embodiments is a central node coupling to a plurality of nodes (e.g., any node) in the system. In accordance with an embodiment, when an entity (e.g., a user, a node, etc.) wants to access a network node in the system, the entity will first arrive at the ZTRAS subscription engine. The ZTRAS subscription engine will validate whether the entity is legitimate or not, and/or determine a target node that the entity is trying to access as an internal trusted node, external trusted node, or untrusted node.

A ZTRAS artificial intelligence (AI) Policy Engine according to one or more example embodiments is a centralized policy engine that leverages machine learning algorithms to analyze and enforce monitoring policies for the target node based on the ZTRAS node subscription ($ZTRAS_{nodeid}$) and other relevant information. In one or more other embodiments, a policy engine that does not utilize machine learning algorithms (e.g., a policy engine that utilizes one or more predefined rules) may be utilized.

A ZTRAS logging system according to one or more example embodiments is a centralized monitoring, visibility, and detection platform that aggregates security logs and audit logs for any network node in the cloud-based telecommunication and/or enterprise network.

An Application Administrator according to one or more example embodiments is a designated administrator to maintain the target node with a ZTRAS node subscription within the telecommunication network and perform activities such as administrative change request management.

A patch repository (or software repository) according to one or more example embodiments is a software repository that provides information such as the latest software updates, software patches, software version, software release date, etc.

In accordance with example embodiments, internal and external threat feeds provide information such as Common Vulnerabilities and Exposures (CVE) ID, Common Vulnerability Scoring System (CVSS) score, Severity, Common Weakness Enumeration (CWE) ID, vulnerable packages, mitigation, exploits, patch, blacklisted IPs, malicious autonomous system numbers (ASNs), malicious domains, etc.

As described herein, an external system is the external user or system that is accessing a target node with a ZTRAS node subscription within the telecommunication network.

FIG. 1 illustrates a system architecture 100 of a zero trust-remote access system (ZTRAS) for providing network access from a user (i.e., user node) 110 to a target node 120 in a network (e.g., a telecommunications network), in accordance with an example embodiment. Here, the user 110 may be an administrative user registering (e.g., onboarding) or configuring the target node 120 in the system, or may be a user (e.g., external or internal) attempting to otherwise access the target node 120.

Referring to FIG. 1, the system architecture 100 includes a ZTRAS subscription engine 101, a ZTRAS AI policy engine 102, an inventory registry 103, a ZTRAS IAM 104, a ZTRAS identity proxy 105, a ZTRAS logging system 106, a vulnerability detection engine 107, an internal vulnerability database 108, and a software repository 109.

The ZTRAS subscription engine 101 is configured to receive a request to onboard or register a target node 120 in the system (ZTRAS), validate the request (e.g., validate the requester), and facilitate registration of the target node 120 in the system (e.g., facilitate registration of the target node 120 with the IAM 104, facilitate registration of security logs and/or audit logs integration for the target node 120 with the logging system 106, facilitate configuring the target node 120 with subscription configuration details and logging configuration details, tec.). The ZTRAS subscription engine 101 is further configured to receive a user request to access the target node 120, and facilitate access (e.g., reject or provide) to the target node 120. The user request may be received from an internal or external user 110 (i.e., user device or user/source node), and may be received from a trusted or untrusted user 110. Further, the trusted user (e.g., internal trusted user or external trusted user) may be a user that has a previously-registered ZTRAS subscription in the system (e.g., has a previously-generated/registered $ZTRAS_{id}$ that is valid). The ZTRAS subscription engine 101 may determine whether the user is a trusted user or an untrusted user, and whether the user is internal or external, and provide access accordingly. The ZTRAS subscription engine is also configured to monitor internal/external thread feeds, and configure the logging system 106 accordingly.

The ZTRAS AI Policy Engine 102 is configured to perform trust validation and trust percentage calculation for the target node 120, and to analyze and enforce monitoring policies for the target node 120 based on the ZTRAS node subscription and other relevant information.

The inventory registry 103 is configured to store target node information (e.g., subscription parameters/details, $ZTRAS_{nodeid}$, trust percentage, etc.). The inventory registry 103 may also store user information that is used to manage ZTRAS subscriptions of users and determine validity of user requests, session data, etc.

The ZTRAS IAM 104 is configured to generate a $ZTRAS_{nodeid}$ for the target node 120 and authenticate a user that is requesting access (e.g., requesting to onboard or subscribe the target node 120) to the network.

The ZTRAS identity proxy 105 is configured to receive a request to access (or configure) a target node from an authenticated trusted user (external or internal), and to provide the request to the target node 120 upon validation (e.g., validation of an access token included with the request).

The ZTRAS logging system 106 is configured to receive, aggregate, store, etc., security logs and audit logs of the target node 120. Further, the logging system 106 is configured to monitor the security logs and audit logs and send alerts based on rules configured therein by the ZTRAS subscription engine 101.

The vulnerability detection engine 107 is configured to check (e.g., continuously, periodically, etc.) the internal vulnerability database 108 for new vulnerabilities and alert the subscription engine 101 accordingly. The internal vulnerability database 108 fetches and stores the latest threat feeds from internal and external sources.

The software repository 109 is configured to store and/or provide information on the latest software updates, patches, etc., for software of the target node 120.

Figure 2:
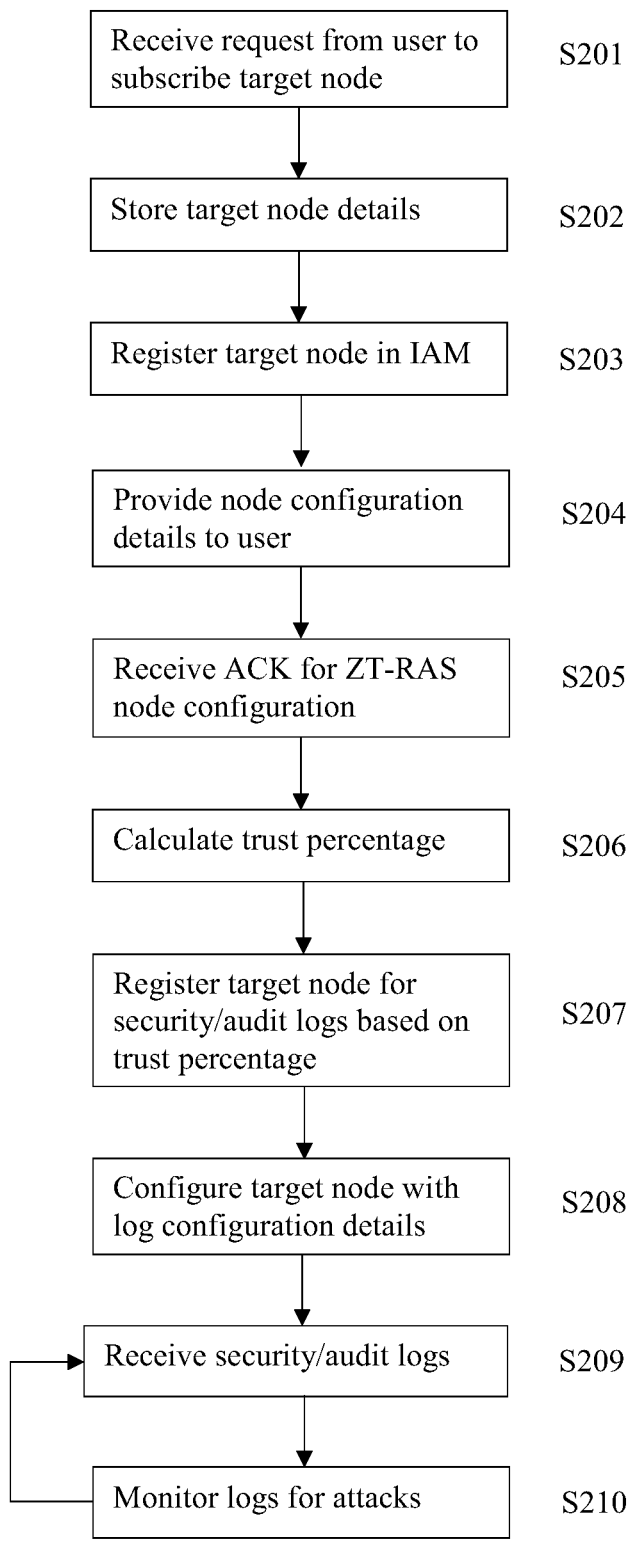
FIG. 2 illustrates a method of registering and configuring a target node in a ZTRAS for a network, according to an example embodiment.

FIG. 2 illustrates a method of registering and configuring a target node in a ZTRAS for a network (e.g., telecommunications or cloud-based enterprise network), according to an example embodiment. The method of FIG. 2 may be performed by at least one processor (e.g., embodied or embodying the components of the system architecture described with reference to FIG. 1) executing instructions stored in memory.

Referring to FIG. 2, at operation S201, a request to subscribe a node (i.e., target node) to the ZTRAS for the network is received. Here, the request may be received by the ZTRAS subscription engine 101 from an authorized user (e.g., administrator), and the request (i.e., the requester) may be validated (i.e., by IAM 104) using a $ZTRAS_{id}$ of the requester.

At operation S202, node details of the target node received from the user are stored in the inventory registry 103. The node details (or subscription parameters) may include at least one of $ZTRAS_{id}$ (subscriber ID), IP (address, subnet, version), ZTRAS IAM registration status, ZTRAS logging system registration status, FQDN/domain, hostname, internal certificate, application name, application type (GUI, terminal)/(HTTPS/TCP), inventory mapping (UUID, DNS entry), location (physical, logical), timestamp, resource segmentation (physical node, platform, VNF/CNF, application, radio, out-of-band), etc.

At operation S203, the target node is registered in the IAM 104, and the IAM 104 generates a $ZTRAS_{nodeid}$ for the target node based on the node details. The $ZTRAS_{nodeid}$ may be generated based on a resource segmentation of the node (e.g., terminal, application, or radio unit). The $ZTRAS_{nodeid}$ is stored in the inventory registry 103.

At operation S204, the ZTRAS subscription engine 101 provides node configuration details (e.g., the $ZTRAS_{nodeid}$) to the user so as to configure the target node for zero-trust remote access.

At operation S205, upon successful configuration of the target node's ZTRAS node subscription, the ZTRAS subscription engine 101 receives an acknowledgement indicating the same.

At operation S206, the AI policy engine 102 calculates a trust percentage for the target node. The calculated trust percentage is stored in the inventory registry 103. In one or more example embodiments, the trust percentage of the node may be used to configure security integrations on the node, such as alerts, monitoring, security logs, audit logs, etc.

At operation S207, the ZTRAS logging system 106 registers the target node for security log and audit log integration based on the trust percentage, and provides log configuration parameters to the ZTRAS subscription engine 101. For example, based on the trust percentage being less than a threshold value, the target node is determined to need security and audit logging in order to increase the trust percentage and initiate the service of the node.

At operation S208, the ZTRAS subscription engine 101 configures the target node with the log configuration parameters (or details).

At operation S209, the ZTRAS logging system 106 receives (e.g., continuously in real time, periodically or event-triggered) security logs and audit logs from the target node.

At operation S210, the ZTRAS logging system 106 monitors the logs for vulnerabilities, attacks, malicious IPs, etc. and outputs alerts accordingly.

Use Case 1: Generation of $ZTRAS_{Tnodeid}$

Figure 3:
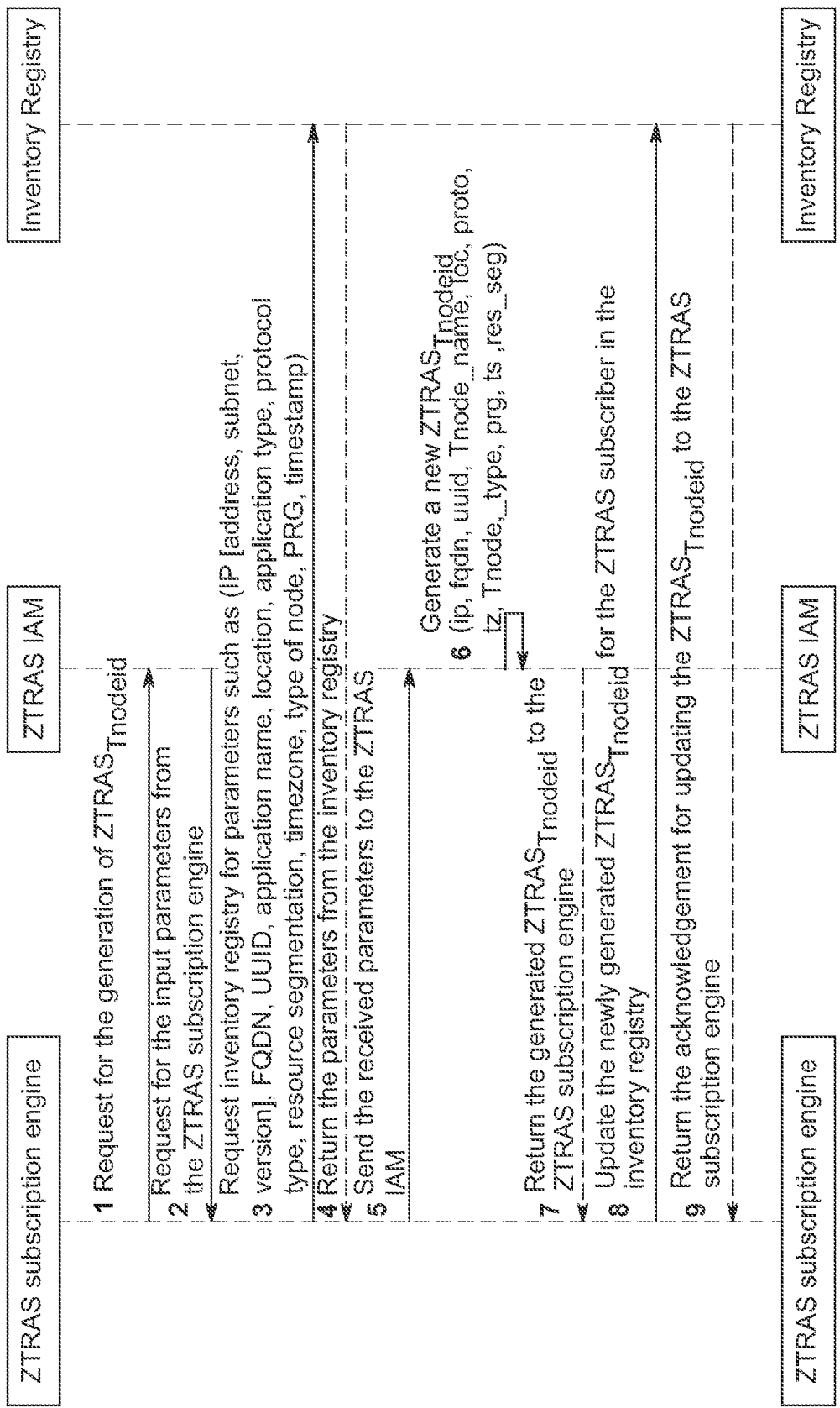
FIG. 3 illustrates a call flow for generation of $ZTRAS_{Tnodeid}$ according to an embodiment.

FIG. 3 illustrates a call flow for generation of a $ZTRAS_{Tnodeid}$ for a target node according to an embodiment. In the example of FIG. 3, the target node for the generation of $ZTRAS_{Tnodeid}$ is assumed to be a terminal node. A terminal node is any node that allows access through TCP (SSH) connections, typically through the command line, within the cloud-based telecommunication network.

Referring to FIG. 3, at (1), the ZTRAS subscription engine requests the ZTRAS IAM to generate $ZTRAS_{Tnodeid}$ (or to generate a ZTRAS id).

At (2), the ZTRAS IAM requests input parameters from the ZTRAS subscription engine.

At (3), the ZTRAS subscription engine requests the inventory registry for parameters such as at least one of IP [address, subnet, version], FQDN, UUID, application name (Tnode name), location (loc), application type, protocol type (proto), resource segmentation (res_seg) (e.g., physical node, platform, VNF/CNF, application, radio, out-of-band), time zone (tz), type of node (Tnode type) (e.g., internal sensitive node, internal non-sensitive node, or external node), pseudo-random generator (PRG), timestamp (ts), etc. These node details may be previously stored in the inventory registry. For example, the ZTRAS subscription engine may receive the node details from a user (e.g., an administrator), such as when the user requests that the target node be subscribed to the ZTRAS or thereafter. The ZTRAS subscription engine may then store the received node details in the inventory registry.

At (4), the inventory registry returns the requested parameters to the ZTRAS subscription engine.

At (5), the ZTRAS subscription engine sends the received parameters to the ZTRAS IAM.

At (6), the ZTRAS IAM generates a new $ZTRAS_{Tnodeid}$ (ip, fqdn, uuid, Tnode name, loc, proto, tz, Tnode type, prg, ts, res_seg) based on the received parameters (i.e., input parameters). In the present example embodiment, the application or target node type (Tnode type) is terminal node and protocol type (proto) is TCP. As the target node type is terminal node, the generated ZTRAS id is a $ZTRAS_{Tnodeid}$.

At (7), the ZTRAS IAM returns the generated $ZTRAS_{Tnodeid}$ to the ZTRAS subscription engine.

At (8), the ZTRAS subscription engine requests the inventory registry to update the newly generated $ZTRAS_{Tnodeid}$ for the ZTRAS subscriber.

Figure 4:
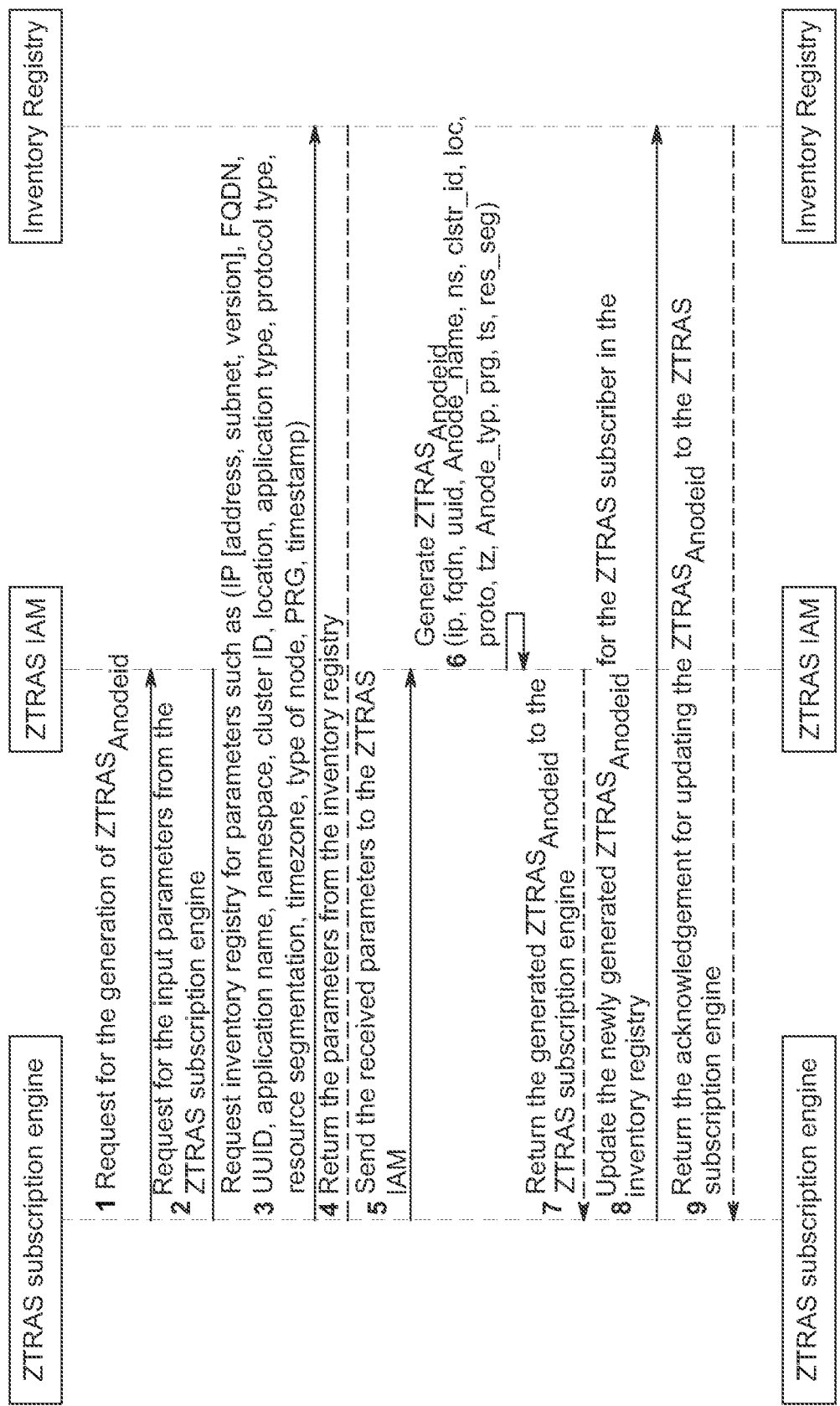
FIG. 4 illustrates a call flow for generation of $ZTRAS_{Anodeid}$ according to an embodiment.

At (9), the inventory registry returns an acknowledgement for updating the $ZTRAS_{Tnodeid}$ to the ZTRAS subscription engine Use Case 2: Generation of $ZTRAS_{Anodeid}$ FIG. 4 illustrates a call flow for generation of a $ZTRAS_{Anodeid}$ according to an embodiment. In the example of FIG. 4, the target node for the generation of $ZTRAS_{Anodeid}$ is assumed to be an application node. An application node may be any node that allows access through HTTP/HTTPS connections within the cloud-based telecommunication network.

Referring to FIG. 4, at (1), the ZTRAS subscription engine requests the ZTRAS IAM to generate a $ZTRAS_{Anodeid}$ (or to generate a ZTRAS id).

At (2), the ZTRAS IAM requests input parameters from the ZTRAS subscription engine.

At (3), the ZTRAS subscription engine requests the inventory registry for parameters such as at least one of IP [address, subnet, version], FQDN, UUID, application name, namespace, cluster ID, location, application type, protocol type, resource segmentation, time zone, type of node, PRG, timestamp, etc. These node details may be previously stored in the inventory registry. For example, the ZTRAS subscription engine may receive the node details from a user (e.g., an administrator), such as when the user requests that the target node be subscribed to the ZTRAS or thereafter. The ZTRAS subscription engine may then store the received node details in the inventory registry.

At (4), the inventory registry returns the requested parameters to the ZTRAS subscription engine.

At (5), the ZTRAS subscription engine sends the received parameters to the ZTRAS IAM.

At (6), the ZTRAS IAM generates a new $ZTRAS_{Anodeid}$ (ip, fqdn, uuid, Anode_name, ns, clstr_id, loc, proto, tz, Anode_type, prg, ts, res_seg) based on the received parameters (i.e., input parameters). In the present example embodiment, the application type (Anode_type) is application node and protocol type (proto) is HTTP/HTTPS. As the target node type is application node, the generated ZTRAS id is a $ZTRAS_{Anodeid}$.

At (7), the ZTRAS IAM returns the generated $ZTRAS_{Anodeid}$ to the ZTRAS subscription engine.

At (8), the ZTRAS subscription engine requests the inventory registry to update the newly generated $ZTRAS_{Anodeid}$ for the ZTRAS subscriber.

At (9), the inventory registry returns an acknowledgement for updating the $ZTRAS_{Anodeid}$ to the ZTRAS subscription engine.

Use Case 3: Generation of $ZTRAS_{Rnodeid}$

Figure 5:
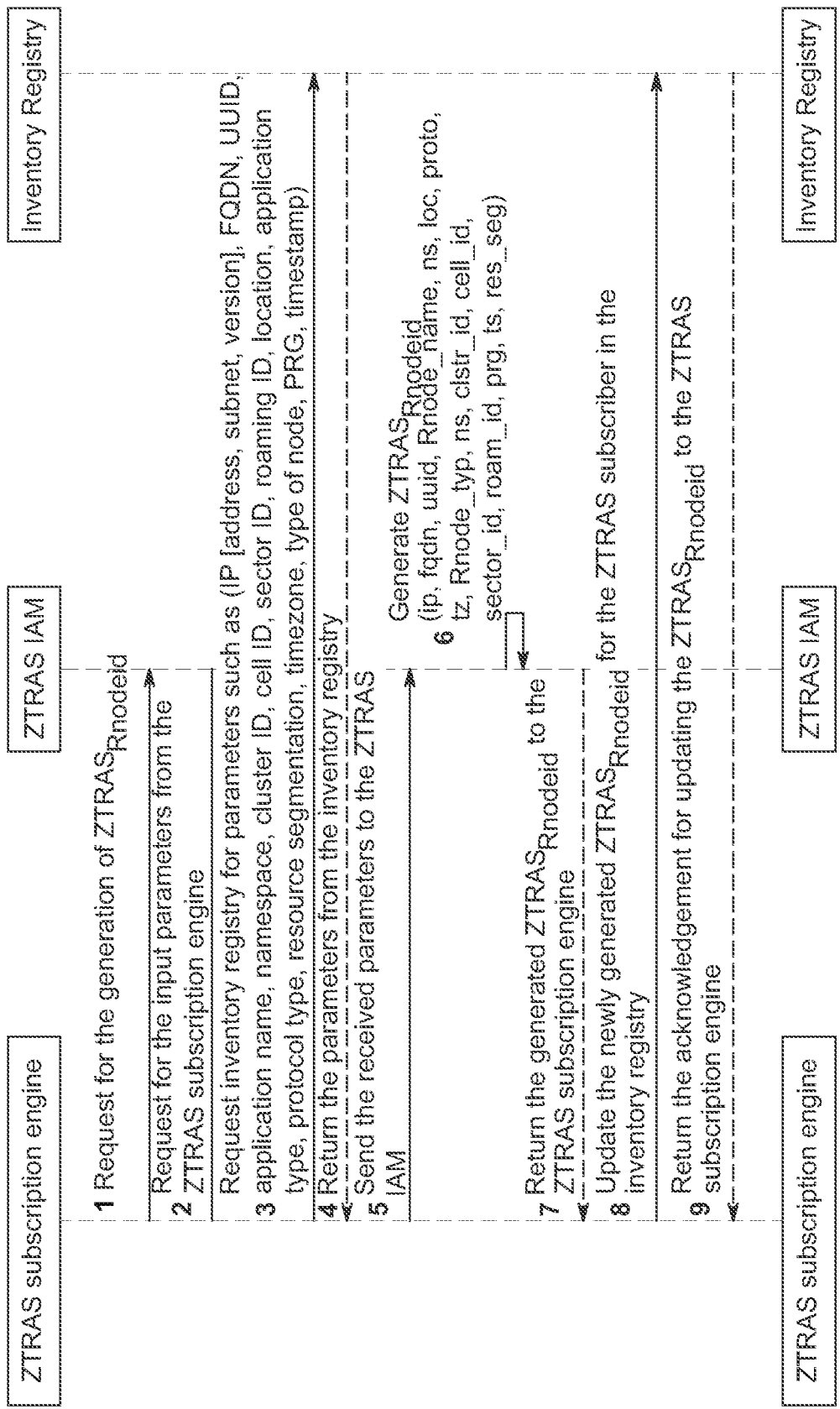
FIG. 5 illustrates a call flow for generation of $ZTRAS_{Rnodeid}$ according to an embodiment.

FIG. 5 illustrates a call flow for generation of $ZTRAS_{Rnodeid}$ according to an embodiment. In the example of FIG. 5, the target node for the generation of $ZTRAS_{Rnodeid}$ is assumed to be a radio node. A radio node is any node that is part of the Radio Access Network (RAN) within the cloud-based telecommunication network.

Referring to FIG. 5, at (1), the ZTRAS subscription engine requests the ZTRAS IAM to generate a $ZTRAS_{Rnodeid}$ (or to generate a ZTRAS id).

At (2), the ZTRAS IAM requests input parameters from the ZTRAS subscription engine.

At (3), the ZTRAS subscription engine requests the inventory registry for parameters such as at least one of IP [address, subnet, version], FQDN, UUID, application name, namespace, cluster ID, cell ID, sector ID, roaming ID, location, application type, protocol type, resource segmentation, time zone, type of node, PRG, timestamp, etc. These node details may be previously stored in the inventory registry. For example, the ZTRAS subscription engine may receive the node details from a user (e.g., an administrator), such as when the user requests that the target node be subscribed to the ZTRAS or thereafter. The ZTRAS subscription engine may then store the received node details in the inventory registry.

At (4), the inventory registry returns the requested parameters to the ZTRAS subscription engine.

At (5), the ZTRAS subscription engine sends the received parameters to the ZTRAS IAM.

At (6), the ZTRAS IAM generates a new $ZTRAS_{Rnodeid}$ (ip, fqdn, uuid, Rnode_name, ns, clstr_id, loc, proto, tz, Rnode_type, ns, clstr_id, cell_id, sector_id, roam_id, prg, ts, res_seg) where the application type (Rnode_type) is radio node and the protocol type (proto) is TCP. As the target node type is radio node, the generated ZTRAS id is a $ZTRAS_{Rnodeid}$.

At (7), the ZTRAS IAM returns the generated $ZTRAS_{Rnodeid}$ to the ZTRAS subscription engine.

At (8), the ZTRAS subscription engine requests the inventory registry to update the newly generated $ZTRAS_{Rnodeid}$ for the ZTRAS subscriber.

At (9), the inventory registry returns an acknowledgement for updating the $ZTRAS_{Rnodeid}$ to the ZTRAS subscription engine.

Use Case 4: ZTRAS Node Subscription for Internal Trusted Node

Figure 6:
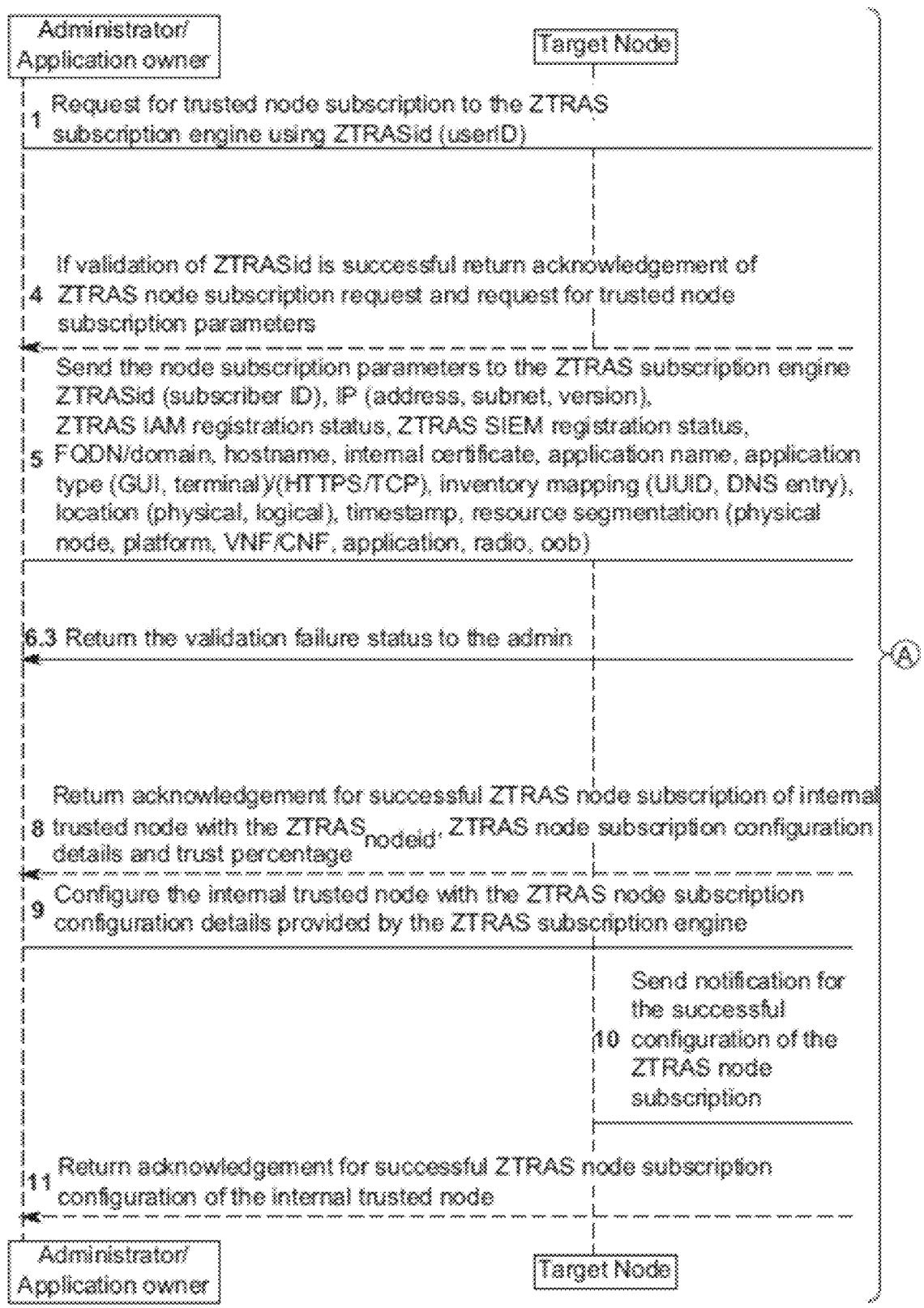
FIG. 6 illustrates a call flow for ZTRAS Node subscription for an internal trusted node according to an embodiment.
Figure 6:
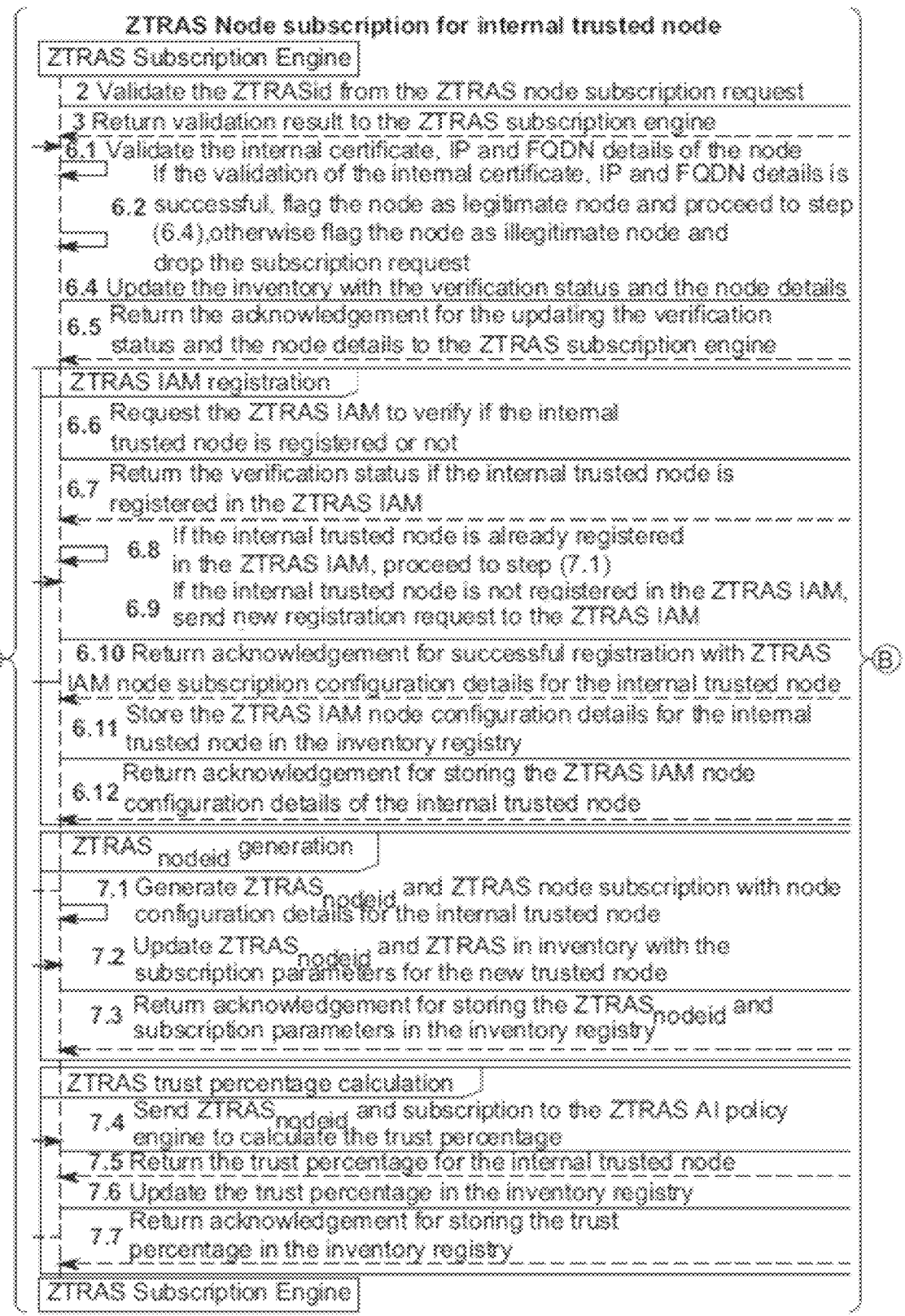
Figure 6:
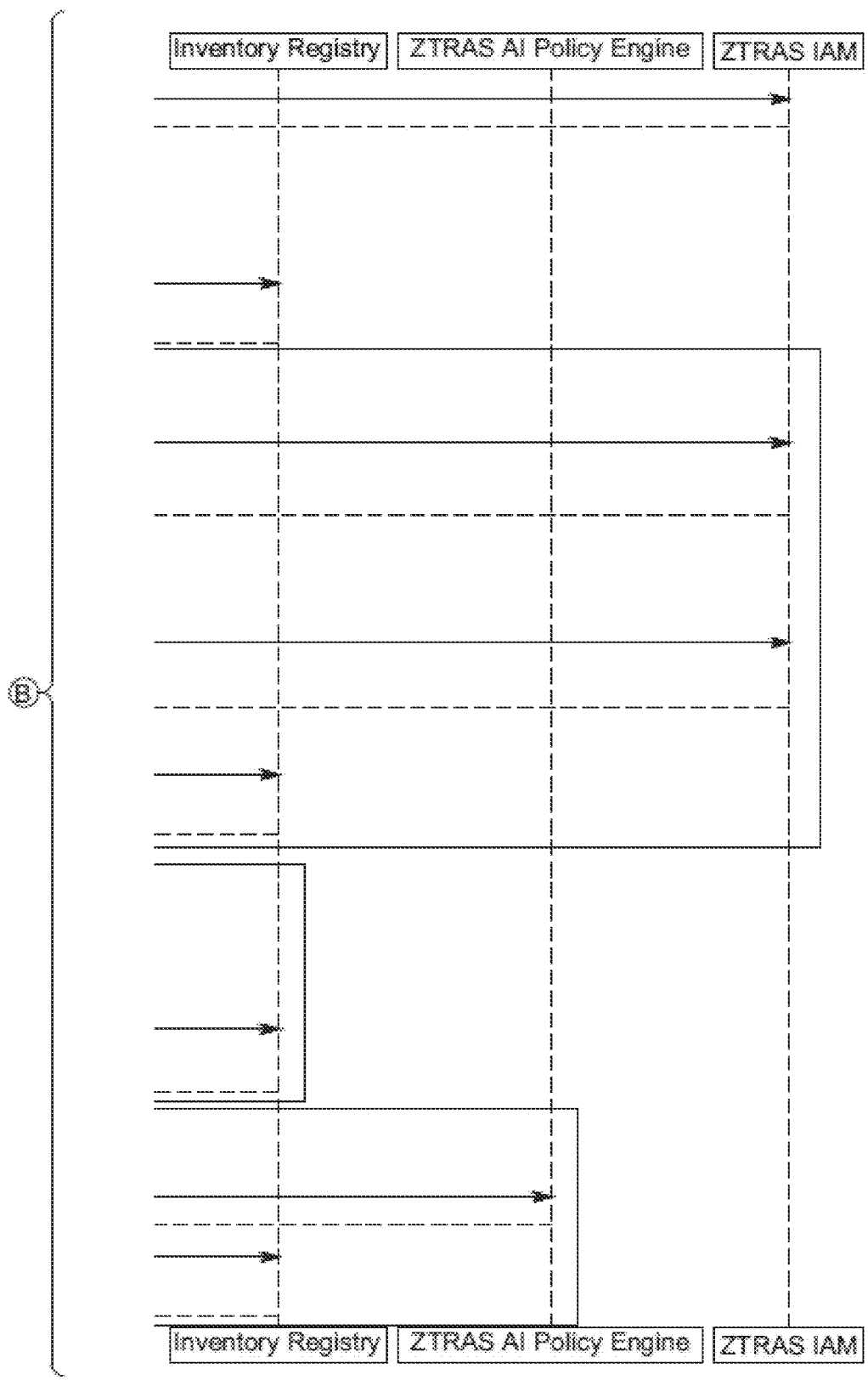

FIG. 6 illustrates a call flow for ZTRAS Node subscription for an internal trusted node according to an embodiment. In the example of FIG. 4, for an internal trusted node (e.g., nodes such as those provided or authorized by the network operator in the telco network system), the following information may be mandatory (without limitation): information such as IP, Hostname, FQDN, application name, namespace, cluster ID, endpoints, MAC, location, UUID, serial number, equipment type, ZTRAS IAM integration status, ZTRAS logging system integration status, internal certificate details, etc. All the above information may be provided during the registration of ZTRAS subscription for the internal trusted node. As such, the inventory registry shall have all the information mentioned above for the internal trusted node.

Referring to FIG. 6, at (1), an administrator requests for the trusted node subscription to the ZTRAS subscription engine using their $ZTRAS_{id}$. According to an example embodiment, the administrator requests may be performed by a service account or automatically (e.g., by an orchestrator).

At (2), the ZTRAS subscription engine validates the $ZTRAS_{id}$ from the ZTRAS node subscription request. That is, the ZTRAS subscription engine validates that the user or entity making the request has the right to onboard a node.

At (3), the ZTRAS IAM returns the validation result to the ZTRAS subscription engine.

At (4), if the validation of the $ZTRAS_{id}$ is successful, the ZTRAS subscription engine returns an acknowledgement of the ZTRAS node subscription request and requests the administrator for the trusted node subscription parameters. To this end, the acknowledgement may itself implicitly signal that the validation is successful, or may include information (e.g., a flag, an information bit, etc.) indicating that the validation is successful. Further, if the validation is unsuccessful, the acknowledgment may include information indicating that the validation is unsuccessful, or a negative acknowledgement may be sent.

At (5), the administrator sends the node subscription parameters to the ZTRAS subscription engine. The node subscription parameters include at least one of $ZTRAS_{id}$ (subscriber ID), IP (address, subnet, version), ZTRAS IAM registration status, ZTRAS logging system registration status, FQDN/domain, hostname, internal certificate, application name, application type (GUI, terminal)/(HTTPS/TCP), inventory mapping (UUID, DNS entry), location (physical, logical), timestamp, resource segmentation (physical node, platform, VNF/CNF, application, radio, out-of-band), etc.

At (6.1), the ZTRAS subscription engine validates the internal certificate, IP and FQDN details of the node.

At (6.2), if the validation of the internal certificate, IP and FQDN details is successful, the ZTRAS subscription engine flags the node as a legitimate node and proceeds to step (6.4). Otherwise, at (6.3) the ZTRAS subscription engine flags the node as an illegitimate node, drops the subscription request, and returns the validation failure status to the administrator.

At (6.4), the ZTRAS subscription engine updates the inventory registry with the verification status and the node details.

At (6.5), the inventory registry returns an acknowledgement for updating the verification status and the node details to the ZTRAS subscription engine.

At (6.6), the ZTRAS subscription engine requests the ZTRAS IAM to verify if the internal trusted node is registered or not.

At (6.7), the ZTRAS IAM returns the verification status if the internal trusted node is registered.

At (6.8), the ZTRAS subscription engine proceeds to step (7.1) if the internal trusted node is already registered or enrolled in the ZTRAS IAM. Otherwise, the method proceeds to (6.9).

At (6.9), the ZTRAS subscription engine sends a new registration request to the ZTRAS IAM, if the internal trusted node is not registered in the ZTRAS IAM.

At (6.10), the ZTRAS IAM returns an acknowledgement for successful registration with the ZTRAS IAM node subscription configuration details for the internal trusted node.

At (6.11), the ZTRAS subscription engine stores the ZTRAS IAM node configuration details for the internal trusted node in the inventory registry.

At (6.12), the inventory registry returns an acknowledgement for storing the ZTRAS IAM node configuration details of the internal trusted node to the ZTRAS subscription engine.

At (7.1), the ZTRAS subscription engine generates a $ZTRAS_{nodeid}$ and ZTRAS node subscription with node configuration details for the internal trusted node. Step (7.1) may correspond to one of FIGS. 3 through 5 (depending on the type of the target node).

At (7.2), the ZTRAS subscription engine updates the $ZTRAS_{nodeid}$ in the inventory registry with the subscription parameters for the new trusted node.

At (7.3), the inventory registry returns an acknowledgement for storing the $ZTRAS_{nodeid}$ and subscription parameters in the inventory registry.

At (7.4), the ZTRAS subscription engine sends the $ZTRAS_{nodeid}$ and subscription to the ZTRAS AI policy engine to calculate a trust percentage.

At (7.5), the ZTRAS AI policy engine returns the trust percentage for the internal trusted node.

At (7.6), the ZTRAS subscription engine updates the trust percentage in the inventory registry.

At (7.7), the inventory registry returns an acknowledgement for storing the trust percentage in the inventory registry.

At (8), the ZTRAS subscription engine returns an acknowledgement for successful ZTRAS node subscription of the internal trusted node with the $ZTRAS_{nodeid}$, ZTRAS node subscription configuration details and trust percentage to the administrator.

At (9), the administrator configures the internal trusted node with the ZTRAS node subscription configuration details provided by the ZTRAS subscription engine.

At (10), the internal trusted node sends a notification for the successful configuration of the ZTRAS node subscription to the ZTRAS subscription engine.

At (11), the ZTRAS subscription engine returns an acknowledgement for the successful ZTRAS node subscription configuration of the internal trusted node to the administrator.

Use Case 5: ZTRAS Node Subscription for External Trusted Node

Figure 7:
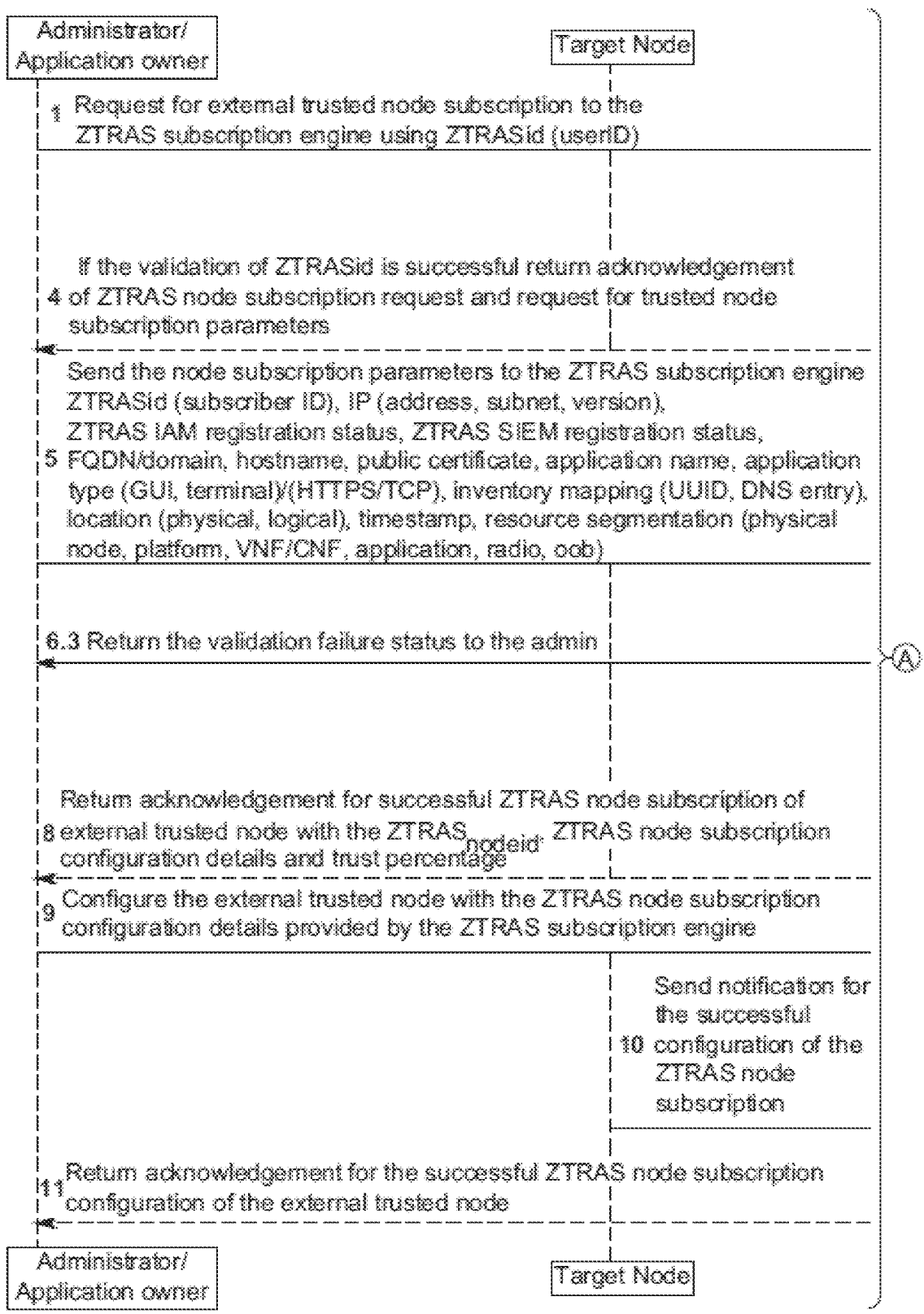
FIG. 7 illustrates a call flow for ZTRAS Node subscription for an external trusted node according to an embodiment.
Figure 7:
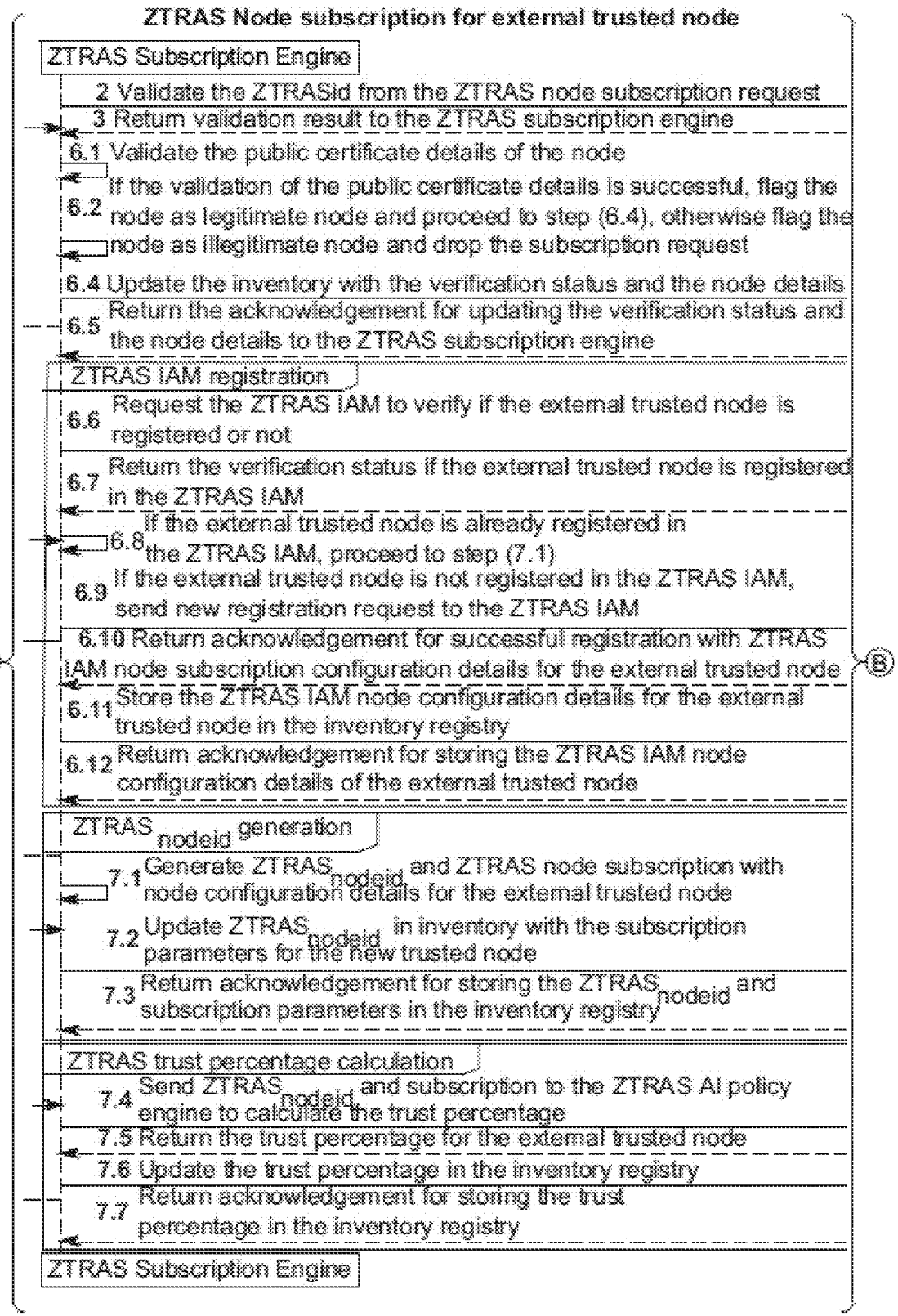
Figure 7:
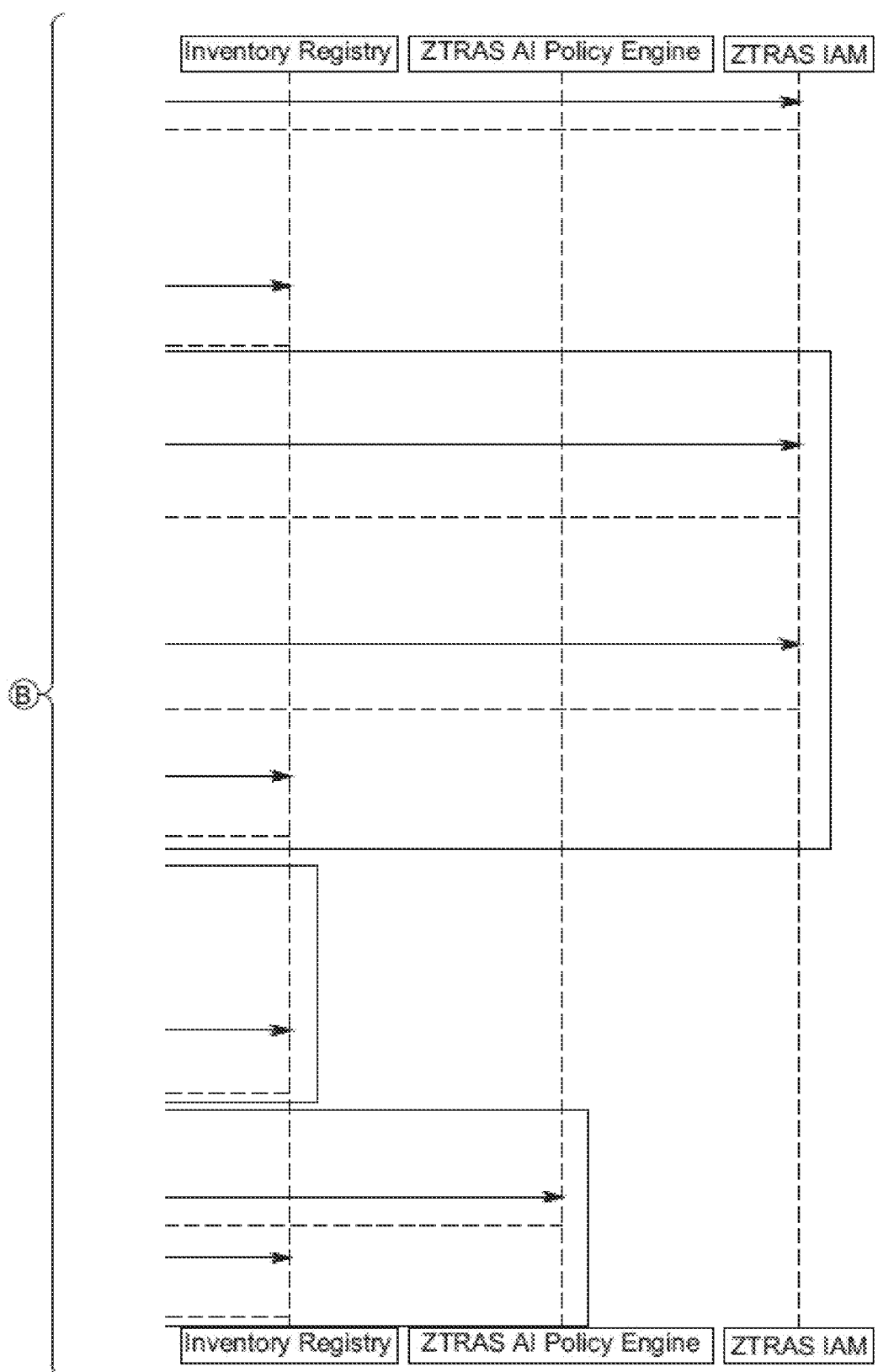

FIG. 7 illustrates a call flow for ZTRAS Node subscription for an external trusted node according to an embodiment. In the example of FIG. 7, for an external trusted node (e.g., nodes such as those provided by vendors or external service providers in the telco network system), the following information may be mandatory (without limitation): information such as IP, FQDN, endpoints, location, UUID, serial number, equipment type, public certificate details, etc. All the above information may be provided during the registration of ZTRAS subscription for the external trusted node. As such, the inventory registry shall have all the information mentioned above for the external trusted node.

Referring to FIG. 7, at (1), the administrator requests for the trusted node subscription to the ZTRAS subscription engine using their (i.e., the administrator's) $ZTRAS_{id}$. According to an example embodiment, the administrator requests may be performed by a service account or automatically (e.g., by an orchestrator).

At (2), the ZTRAS subscription engine validates the $ZTRAS_{id}$ from the ZTRAS node subscription request. That is, the ZTRAS subscription engine validates that the user or entity making the request has the right to onboard a node.

At (3), the ZTRAS IAM returns the validation result to the ZTRAS subscription engine.

At (4), if the validation of the $ZTRAS_{id}$ is successful, the ZTRAS subscription engine returns an acknowledgement of ZTRAS node subscription request and requests the administrator for the trusted node subscription parameters. To this end, the acknowledgement may itself implicitly signal that the validation is successful, or may include information (e.g., a flag, an information bit, etc.) indicating that the validation is successful. Further, if the validation is unsuccessful, the acknowledgment may include information indicating that the validation is unsuccessful, or a negative acknowledgement may be sent.

At (5), the administrator sends the node subscription parameters to the ZTRAS subscription engine. The node subscription parameters include at least one of $ZTRAS_{id}$ (subscriber ID), IP (address, subnet, version), ZTRAS IAM registration status, ZTRAS logging system registration status, FQDN/domain, hostname, external certificate, application name, application type (GUI, terminal)/(HTTPS/TCP), inventory mapping (UUID, DNS entry), location (physical, logical), timestamp, resource segmentation (physical node, platform, VNF/CNF, application, radio, out-of-band).

At (6.1), the ZTRAS subscription engine validates the external certificate details of the node. Here, the external certificate may be a public certificate or a third party certificate (e.g., issued by a vendor's certificate authority (CA)).

At (6.2), if the validation of the external certificate details is successful, the ZTRAS subscription engine flags the node as a legitimate node and proceeds to step (6.4). Otherwise, at (6.3), the ZTRAS subscription engine flags the node as an illegitimate node and drops the subscription request, and returns the validation failure status to the administrator.

At (6.4), the ZTRAS subscription engine updates the inventory registry with the verification status and the node details.

At (6.5), the inventory registry returns an acknowledgement for updating the verification status and the node details to the ZTRAS subscription engine.

At (6.6), the ZTRAS subscription engine requests the ZTRAS IAM to verify if the external trusted node is registered or not.

At (6.7), the ZTRAS IAM returns the verification status if the external trusted node is registered.

At (6.8), the ZTRAS subscription engine proceeds to step (7.1) if the external trusted node is already registered in the ZTRAS IAM. Otherwise, the method proceeds to (6.9).

At (6.9), the ZTRAS subscription engine sends a new registration request to the ZTRAS IAM, if the external trusted node is not registered in the ZTRAS IAM.

At (6.10), the ZTRAS IAM returns an acknowledgement for successful registration with the ZTRAS IAM node subscription configuration details for the external trusted node.

At (6.11), the ZTRAS subscription engine stores the ZTRAS IAM node configuration details for the external trusted node in the inventory registry.

At (6.12), the inventory registry returns an acknowledgement for storing the ZTRAS IAM node configuration details of the external trusted node to the ZTRAS subscription engine.

At (7.1), the ZTRAS subscription engine generates a $ZTRAS_{nodeid}$ and ZTRAS node subscription with node configuration details for the external trusted node. Step (7.1) may correspond to one of FIGS. 3 through 5 (depending on the type of the target node).

At (7.2), the ZTRAS subscription engine updates the $ZTRAS_{nodeid}$ in the inventory registry with the subscription parameters for the new trusted node.

At (7.3), the inventory registry returns an acknowledgement for storing the $ZTRAS_{nodeid}$ and subscription parameters in the inventory registry.

At (7.4), the ZTRAS subscription engine sends the $ZTRAS_{nodeid}$ and subscription to the ZTRAS AI policy engine to calculate the trust percentage.

At (7.5), the ZTRAS AI policy engine returns the trust percentage for the external trusted node.

At (7.6), the ZTRAS subscription engine updates the trust percentage in the inventory registry.

At (7.7), the inventory registry returns an acknowledgement for storing the trust percentage in the inventory registry.

At (8), the ZTRAS subscription engine returns an acknowledgement for successful ZTRAS node subscription of external trusted node with the $ZTRAS_{nodeid}$, ZTRAS node subscription configuration details and trust percentage to the administrator.

At (9), the administrator configures the external trusted node with the ZTRAS node
subscription configuration details provided by the ZTRAS subscription engine.

At (10), the external trusted node sends a notification for the successful configuration of the ZTRAS node subscription to the ZTRAS subscription engine.

At (11), the ZTRAS subscription engine returns an acknowledgement for the successful ZTRAS node subscription configuration of the external trusted node to the administrator.

Figure 8:
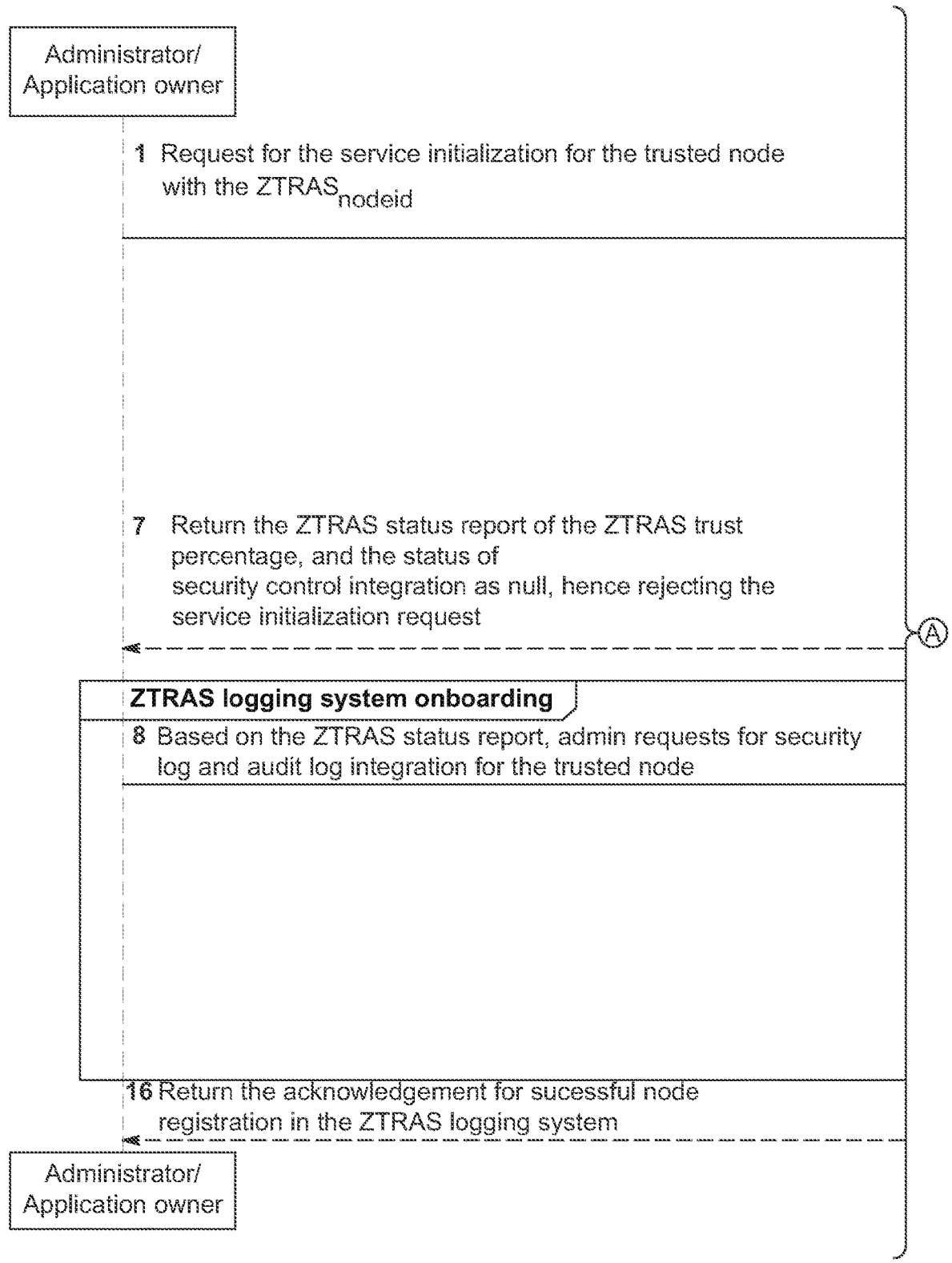
FIG. 8 illustrates a call flow for ZTRAS security logs and audit logs registration based on ZTRAS trust percentage, according to an embodiment.
Figure 8:
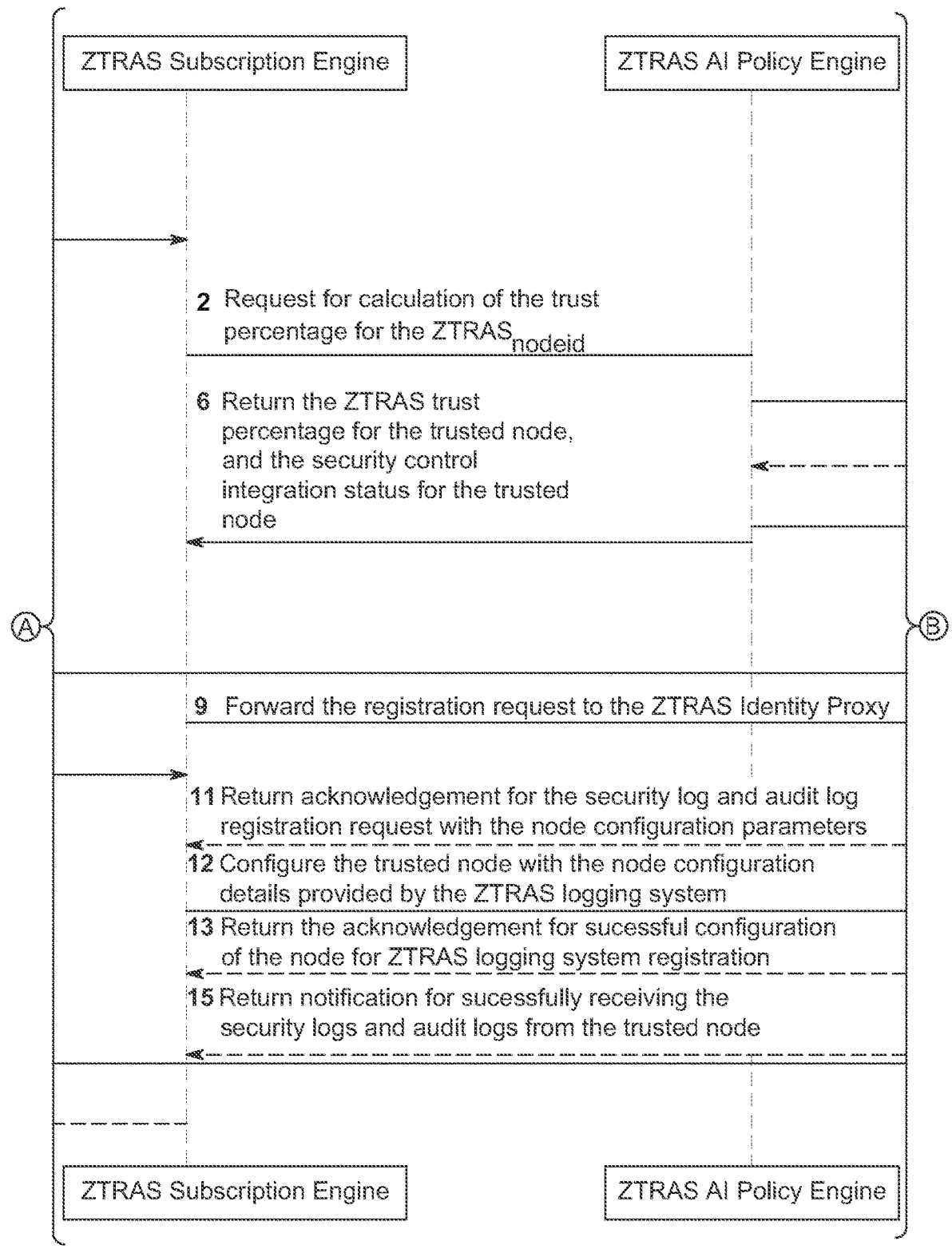
Figure 8:
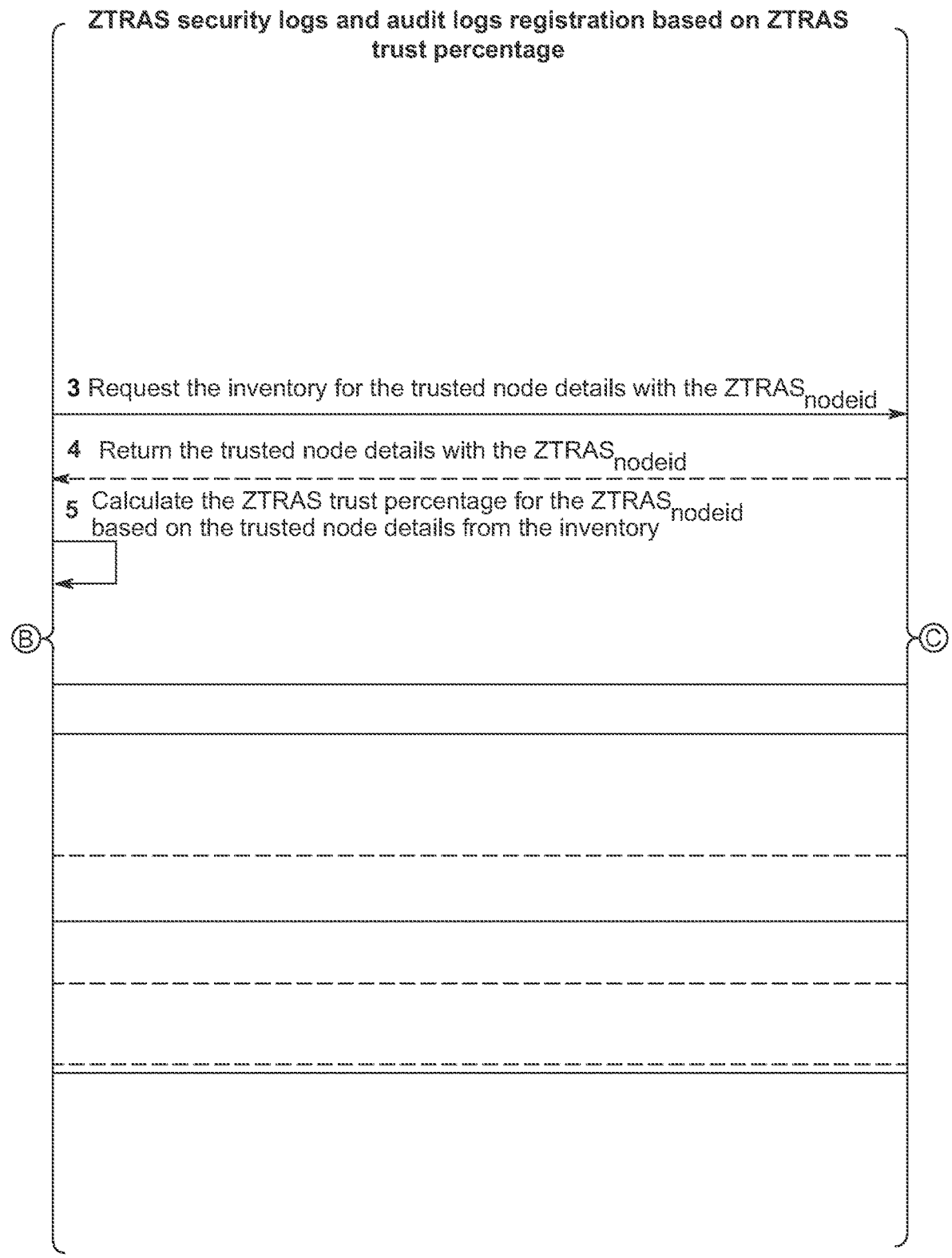
Figure 8:
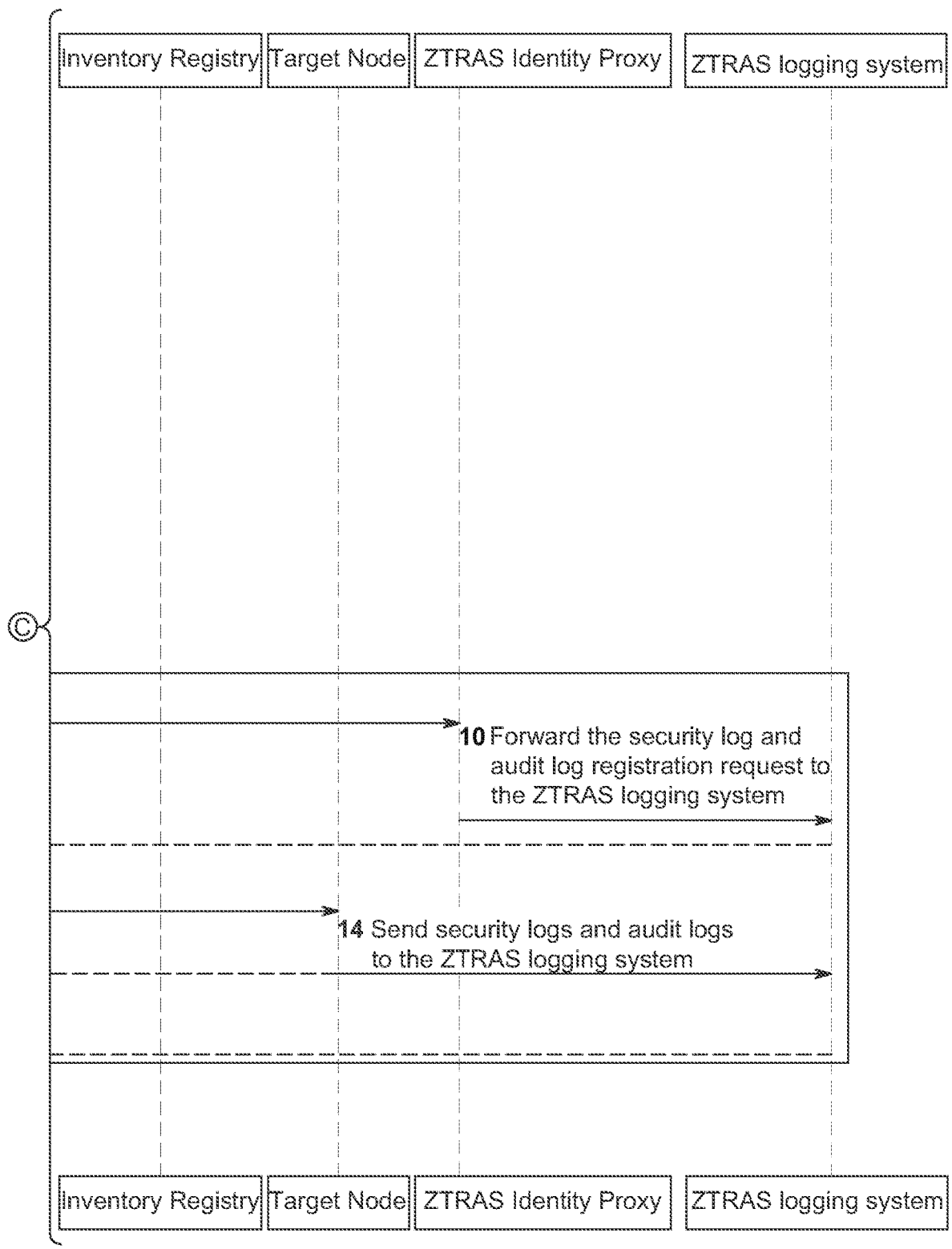

Use Case 6: ZTRAS Security Logs and Audit Logs Registration Based on ZTRAS Trust Percentage FIG. 8 illustrates a call flow for ZTRAS security logs and audit logs registration based on ZTRAS trust percentage, according to an embodiment. The ZTRAS security logs and audit logs registration may be performed as part of an onboarding process for the node, e.g., as part of the subscribing process for the node, or subsequent thereto. In the example of FIG. 8, the administrator has a $ZTRAS_{id}$ and ZTRAS subscription as a user, and the trust percentage for the trusted node is calculated based on the security parameters for the trusted node, such as at least one of credential strength, visibility of logs (e.g., security and audit logs integration), IAM registration, etc.

Referring to FIG. 8, at (1), the administrator requests the ZTRAS subscription engine for a service initialization (i.e., initializing the service that the node provides, such initiating the operations or services of a radio unit) for a trusted node with a $ZTRAS_{nodeid}$. That is, the request may include the $ZTRAS_{nodeid}$ of the trusted node (i.e., trusted external or internal target node).

At (2), the ZTRAS subscription engine requests the ZTRAS AI policy engine for calculation of the trust percentage for the $ZTRAS_{nodeid}$. The request may include the $ZTRAS_{nodeid}$.

At (3), the ZTRAS AI policy engine requests the inventory registry for the trusted node details for the $ZTRAS_{nodeid}$. That is, the request may include the $ZTRAS_{nodeid}$.

At (4), the inventory registry returns the trusted node details with the $ZTRAS_{nodeid}$ to the ZTRAS AI policy engine. The node details may include the parameters used to calculate the trust percentage, including the security control integration status of the target node (e.g., whether security and audit logging has been integrated or configured in the target node (status of security log and audit log integration), whether the target node has been registered in the IAM, etc.), etc.

At (5), the ZTRAS AI policy engine calculates the ZTRAS trust percentage for the $ZTRAS_{nodeid}$ based on the trusted node details from the inventory registry.

At (6), the ZTRAS AI policy engine returns the ZTRAS trust percentage for the trusted node and a status of security log and audit log integration for the trusted node to the ZTRAS subscription engine. The ZTRAS subscription engine may determine whether to initialize the service of the target node based on the ZTRAS trust percentage (e.g., if the trust percentage is below a predetermined threshold value, the service will not be initialized).

In the present example, security and audit logging has not been integrated or configured in the target node, and as a result the trust percentage is insufficient for initializing service of the target node. Therefore, at (7), the ZTRAS subscription engine returns the status of security log and audit log integration (e.g., as included in or with a status report of the ZTRAS trust percentage) as null, hence rejecting the service initialization request to the administrator.

At (8), based on the status of security log and audit log integration being null, the administrator requests registration for the security log and the audit log integration for the trusted node to the ZTRAS subscription engine.

At (9), the ZTRAS subscription engine forwards the registration request to the ZTRAS Identity Proxy.

At (10), the ZTRAS Identity Proxy forwards the security log and audit log registration request to the ZTRAS logging system.

At (11), the ZTRAS logging system returns the acknowledgement for the security log and audit log registration request with node configuration parameters to the ZTRAS subscription engine.

At (12), the ZTRAS subscription engine configures the trusted node with the node configuration parameters or details provided by the ZTRAS logging system, i.e., to configure the target node with security log and audit log integration. The configuration details may include location information (e.g., IP address) of the endpoint (i.e., ZTRAS logging system), a port number, a protocol type, format(s) of the log(s), etc.

At (13), the target node returns an acknowledgement for successful configuration of the node for ZTRAS logging system registration to the ZTRAS subscription engine.

Accordingly, at (14), the target node sends the security logs and the audit logs to the ZTRAS logging system. Here, the target node may send the logs periodically, continuously (e.g., using real-time streams), and/or based on event triggers. The reporting frequency may be configured in the configuration parameters, may depend on the target node type, etc.

At (15), the ZTRAS logging system returns a notification for successfully receiving the security logs and audit logs from the trusted node to the ZTRAS subscription engine.

At (16), the ZTRAS subscription engine returns an acknowledgement for successful node registration in the ZTRAS logging system to the administrator.

Use Case 7: Detection of Vulnerabilities Using ZTRAS

Figure 9:
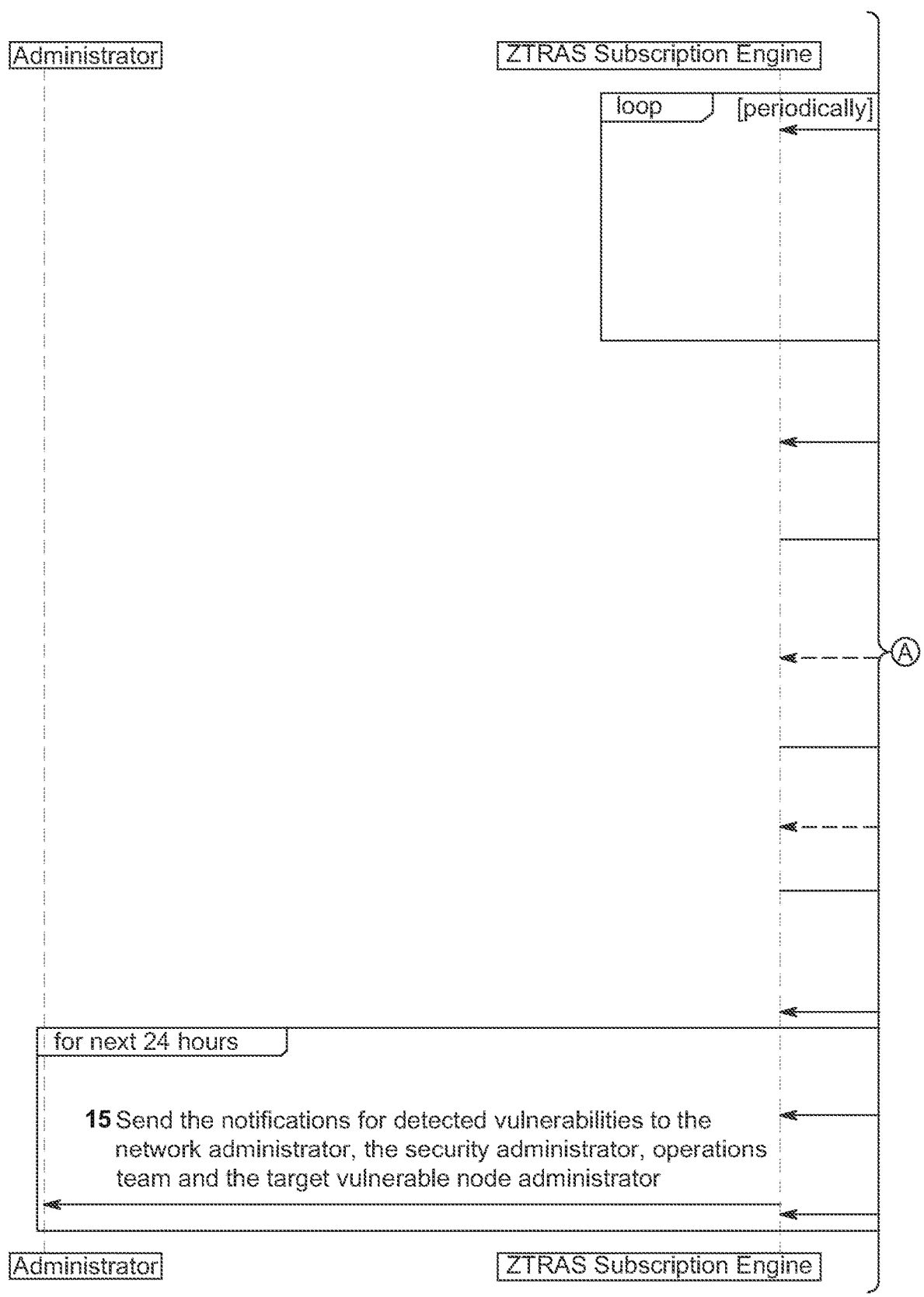
FIG. 9 illustrates a call flow for detection of vulnerabilities using ZTRAS, according to an embodiment.
Figure 9:
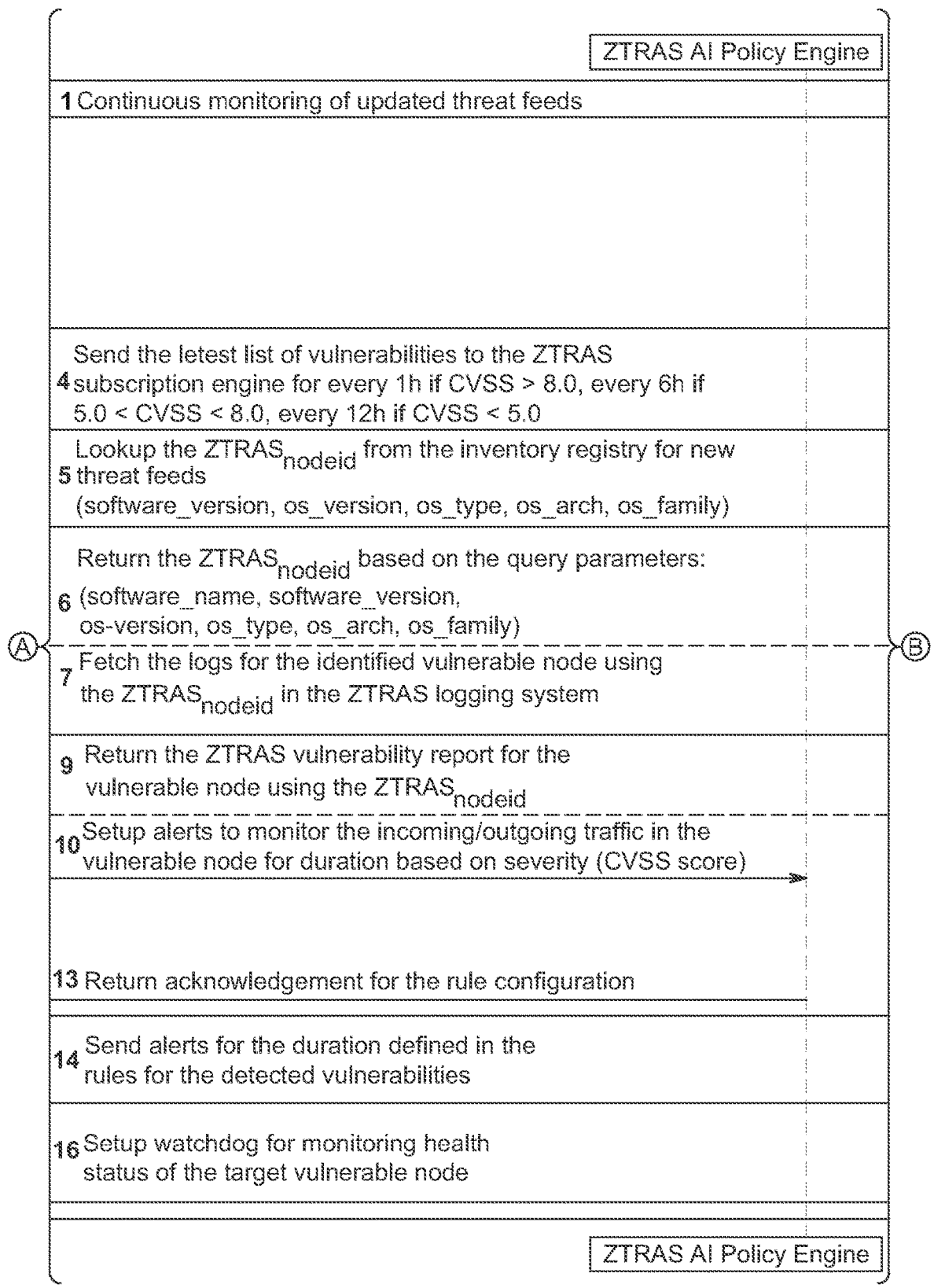
Figure 9:
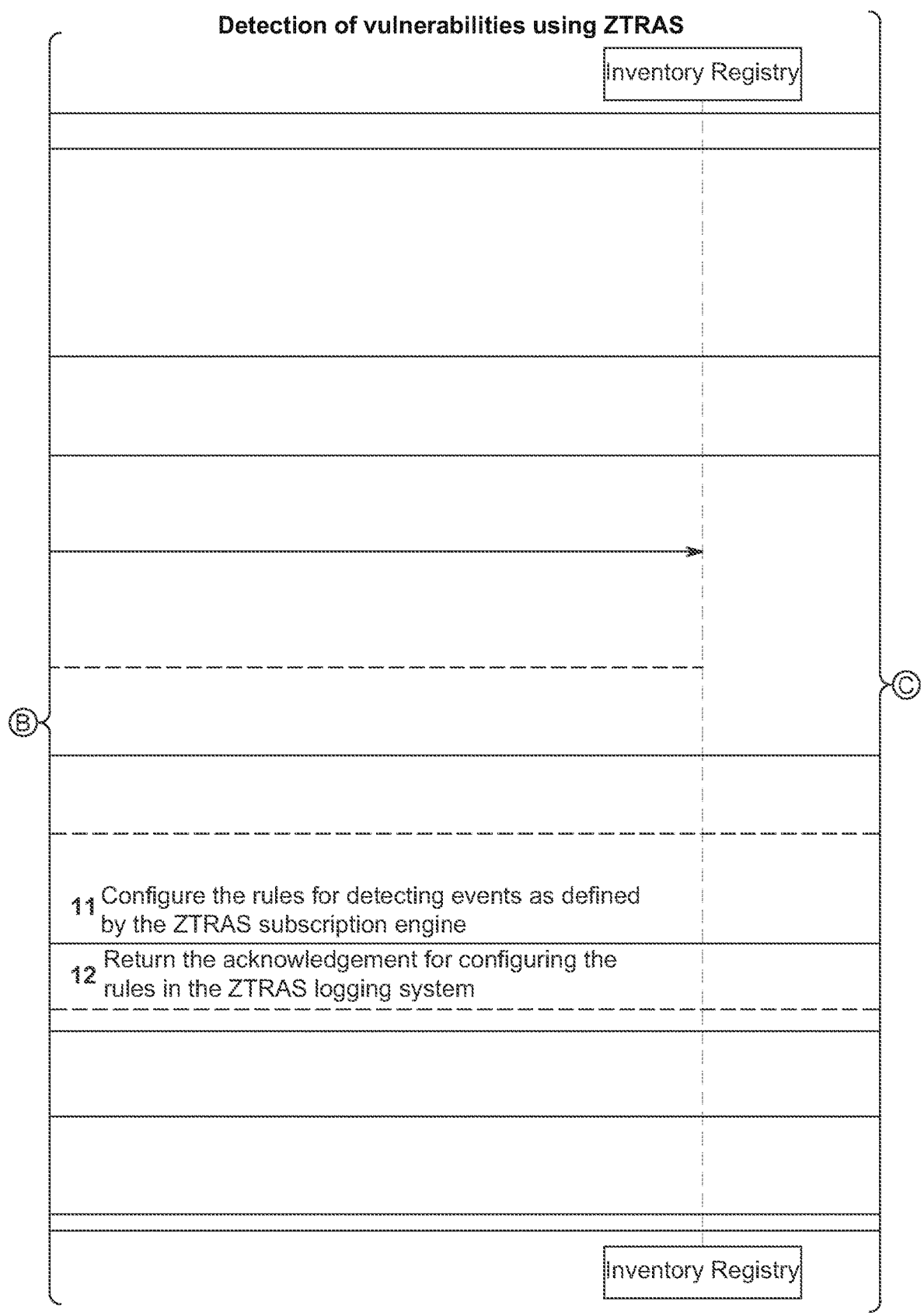
Figure 9:
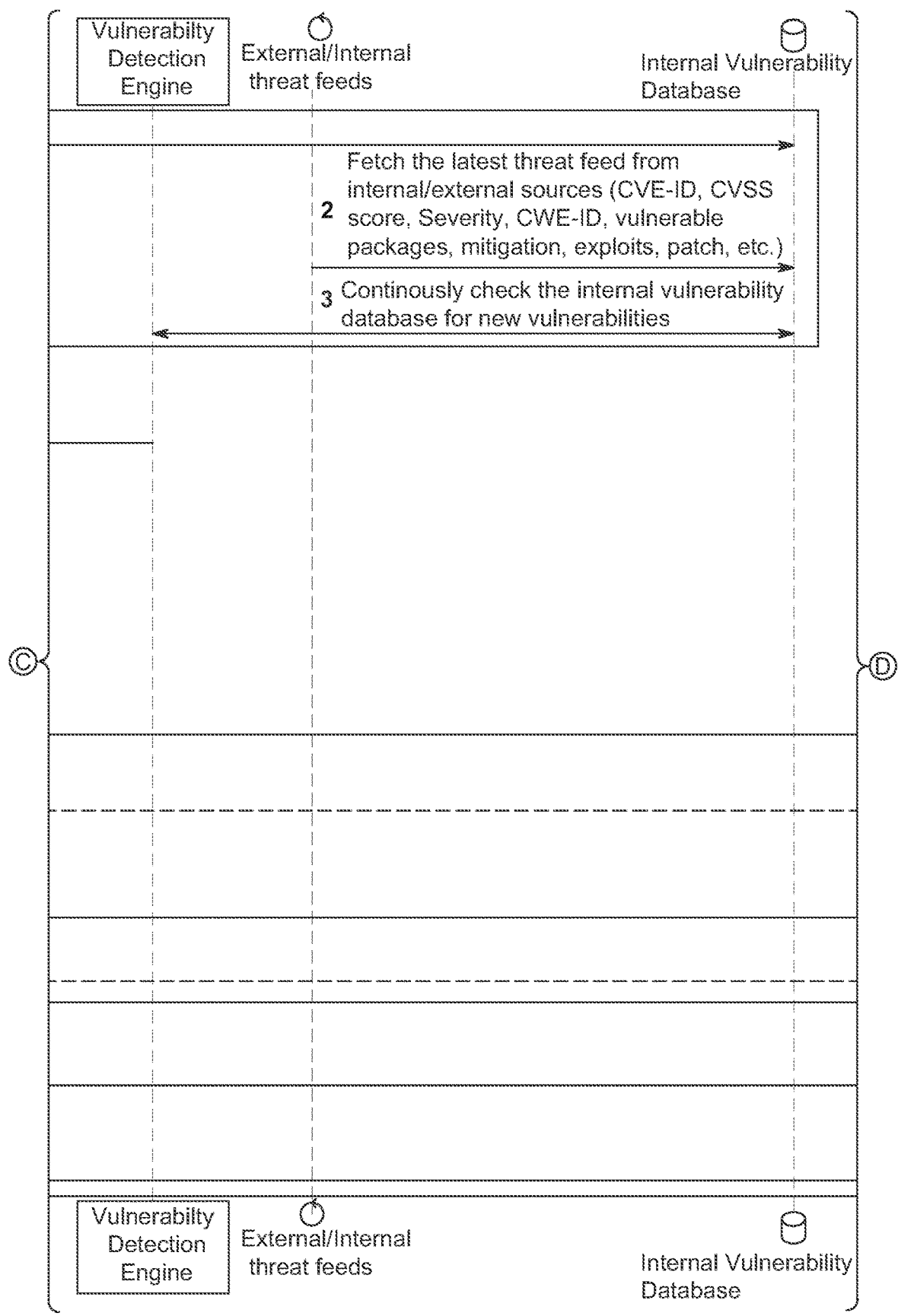
Figure 9:
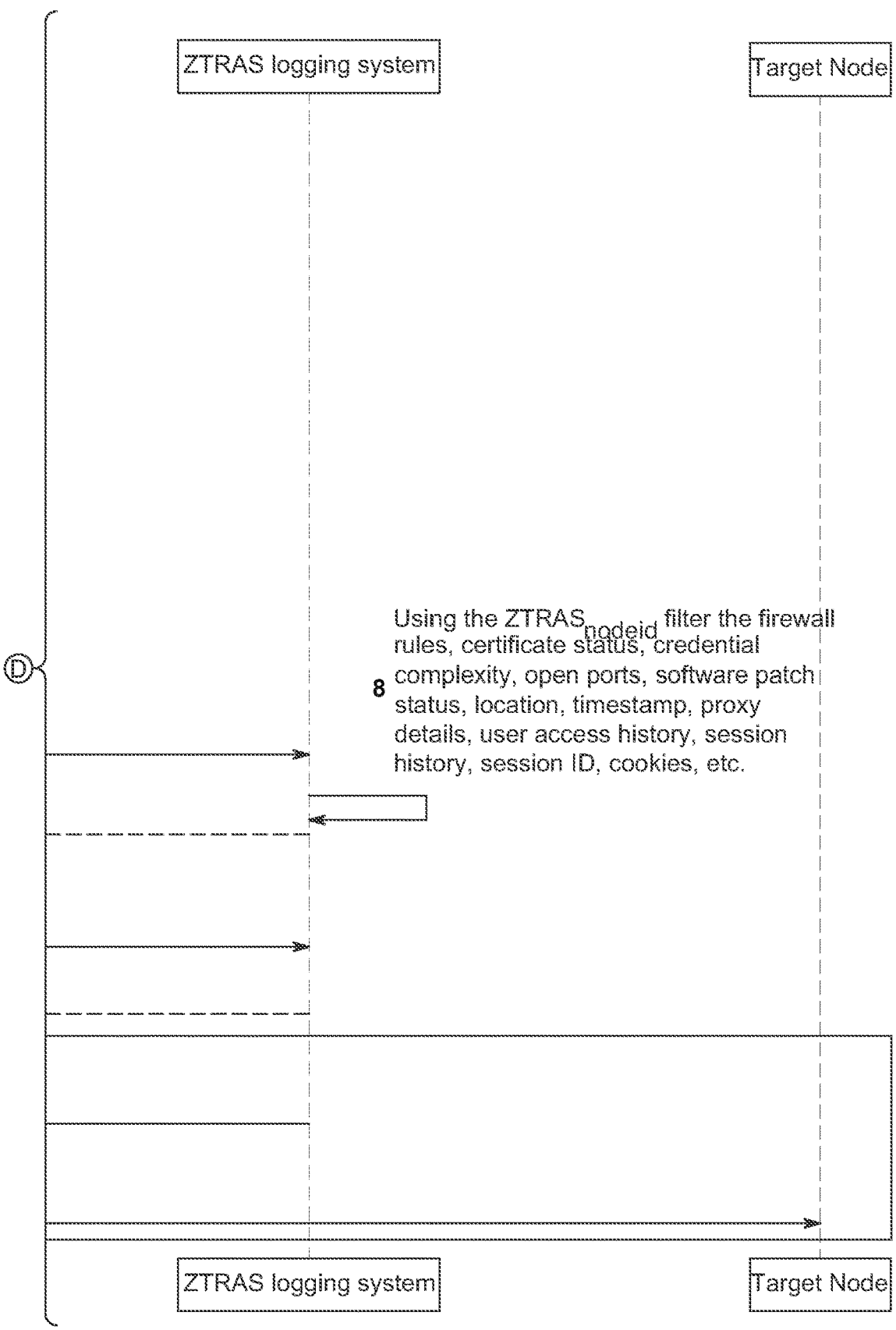

FIG. 9 illustrates a Call Flow for Detection of Vulnerabilities Using ZTRAS, according to an embodiment. In the example of FIG. 9, the $ZTRAS_{nodeid}$ for the target node exists in the inventory registry along with the parameters such as software version, OS (operating system) version, platform, etc.

Referring to FIG. 9, at (1), the ZTRAS subscription engine continuously (or periodically, event-triggered, etc.) monitors an internal vulnerability database for updated threat feeds from internal and external sources.

At (2), the internal vulnerability database fetches the latest threat feeds from internal and external sources containing, for example, the following attributes: CVE-ID, CVSS score, Severity, CWE-ID, vulnerable packages, mitigation, exploits, patch, etc.

At (3), the vulnerability detection engine continuously checks the internal vulnerability database for new vulnerabilities. Steps (1) through (3) are performed repeatedly (e.g., periodically).

At (4), the vulnerability detection engine sends the latest list of vulnerabilities to the ZTRAS subscription engine. For example, the vulnerability detection engine may send the latest list every hour if the CVSS score is greater than 8.0, every six hours if the CVSS score is greater than 5.0 and less than 8.0, and every 12 hours if the CVSS score is less than 5.0.

At (5), the ZTRAS subscription engine looks up a $ZTRAS_{nodeid}$ from the inventory registry for new threat feeds matching parameters such as: software_version, os_version, os_type, os_arch, os_family, etc. Here, the parameters may be determined based on the vulnerability information received from the vulnerability detection engine.

At (6), the inventory registry returns the $ZTRAS_{nodeid}$ based on the query parameters such as software name, software_version, os_version, os_type, os_arch, os_family, etc., to the ZTRAS subscription engine.

At (7), the ZTRAS subscription engine fetches the logs for the identified vulnerable node using the $ZTRAS_{nodeid}$ in the ZTRAS logging system.

At (8), using the $ZTRAS_{nodeid}$, the ZTRAS logging system filters the logs based on parameters such as firewall rules, certificate status, credential complexity, open ports, software patch status, location, timestamp, proxy details, user access history, session history, session ID, cookies, etc.

At (9), the ZTRAS logging system returns the ZTRAS vulnerability report for the vulnerable node using the $ZTRAS_{nodeid}$.

At (10), the ZTRAS subscription engine sets up alerts to monitor the incoming and outgoing traffic in the vulnerable node for a pre-defined duration based on the severity of the vulnerability (CVSS score) to the ZTRAS AI policy engine.

At (11), the ZTRAS AI policy engine configures the rules for detecting events as defined by the ZTRAS subscription engine in the ZTRAS logging system.

At (12), the ZTRAS logging system returns an acknowledgement for configuring the rules to the ZTRAS AI policy engine.

At (13), the ZTRAS AI policy engine returns the acknowledgement for the rule configuration in the ZTRAS logging system to the ZTRAS subscription engine.

At (14), the ZTRAS logging system sends alerts for the detected vulnerabilities throughout the duration defined in the rules to the ZTRAS subscription engine.

At (15), the ZTRAS subscription engine sends the notifications for the detected vulnerabilities to the network administrator, the security administrator, operations team and/or the vulnerable target node's administrator.

At (16), the ZTRAS subscription engine sets up a watchdog for monitoring the health status of the vulnerable target node for the duration defined in the rules.

Use Case 8: Malicious IP Detection Using ZTRAS

Figure 10:
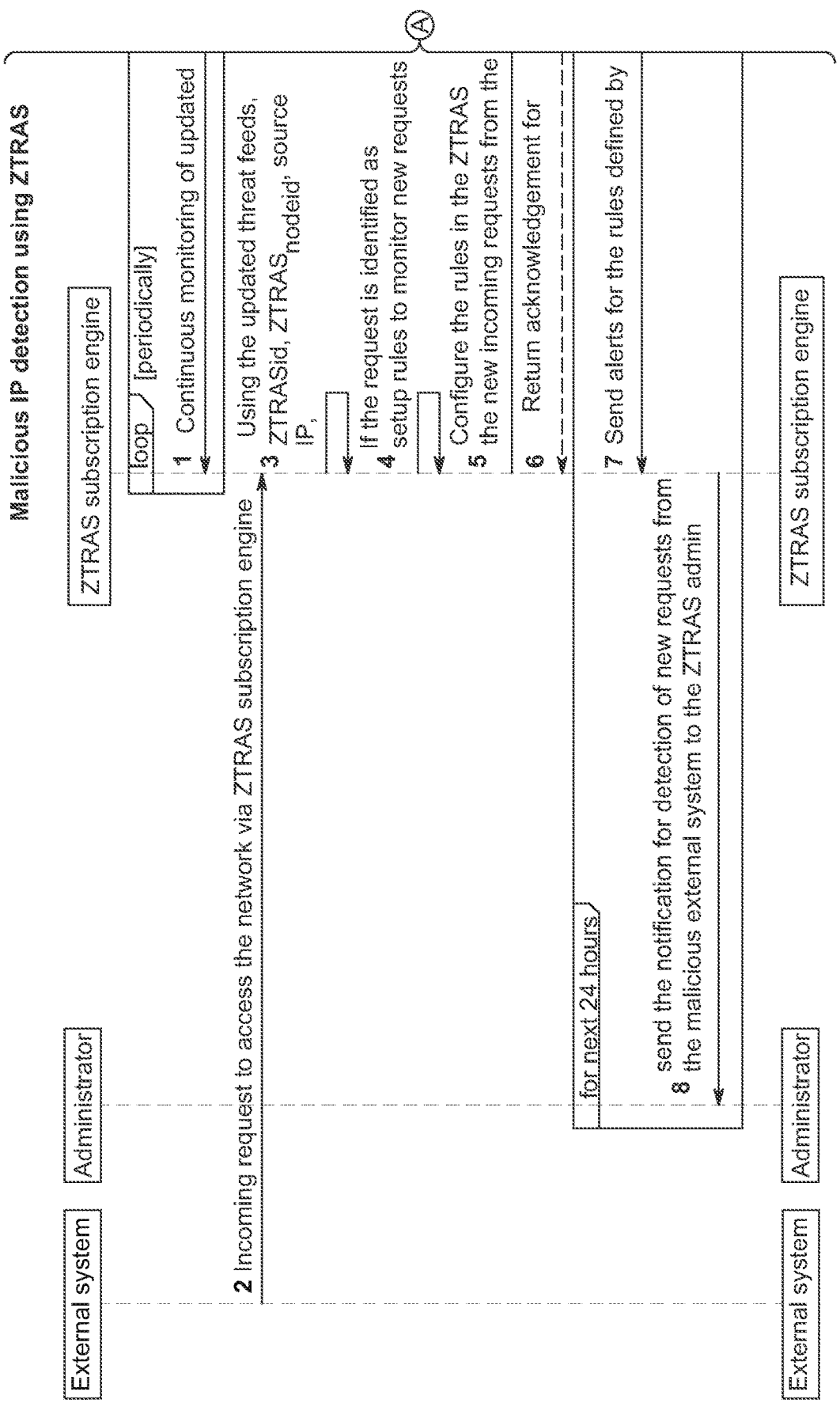
FIG. 10 illustrates a call flow for detection of malicious IP in incoming requests using ZTRAS, according to an embodiment.
Figure 10:
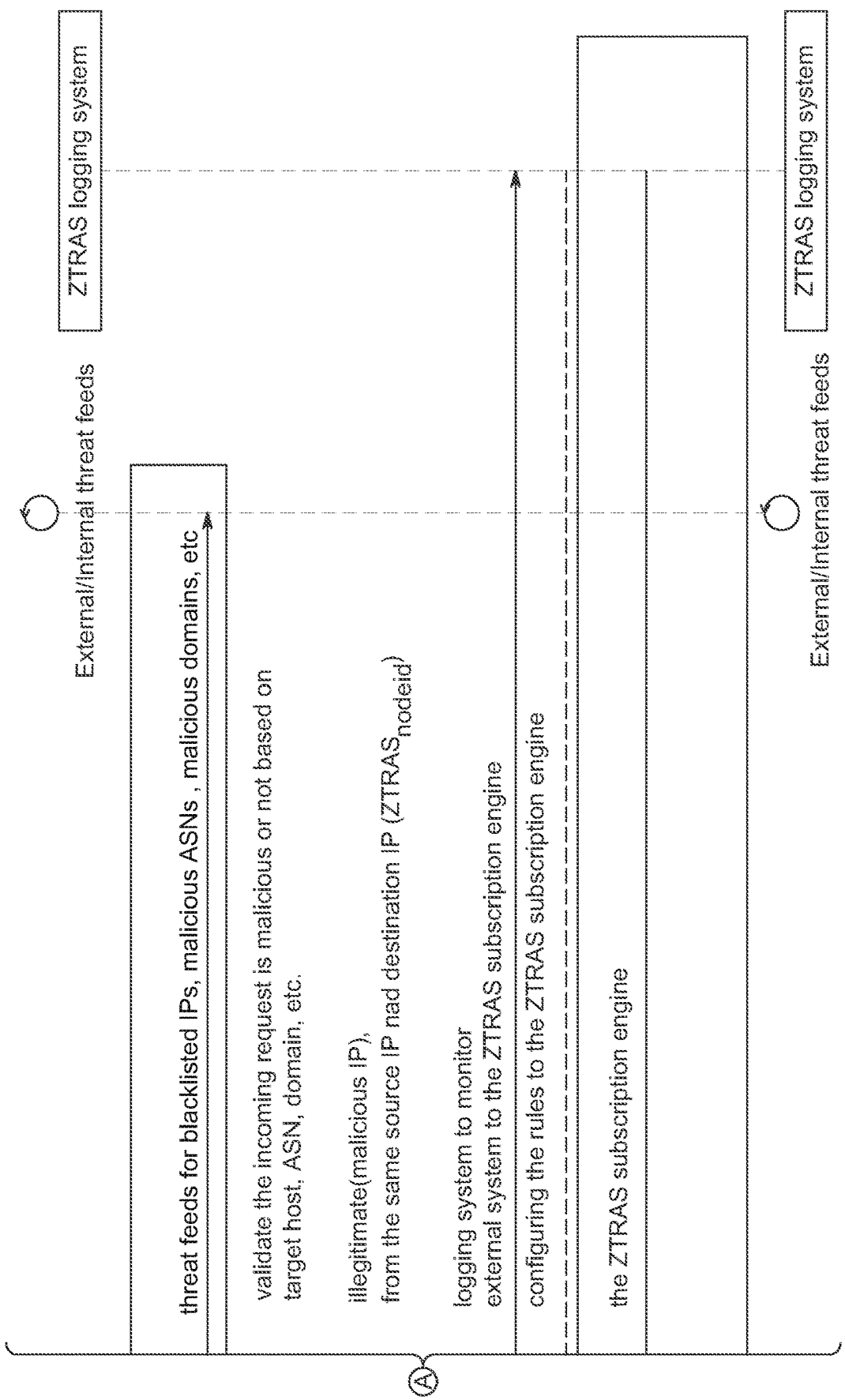

FIG. 10 illustrates a call flow for detection of malicious IP in incoming requests using ZTRAS, according to an embodiment. In the example of FIG. 10, the incoming request from an external system is assumed to be illegitimate (malicious) based on the definitions in the internal and external threat feeds.

Referring to FIG. 10, at (1), the ZTRAS subscription engine continuously (or periodically, event-triggered, etc.) monitors the internal and external threat feeds (e.g., as stored the internal vulnerability database or external feeds) for updates such as blacklisted IPs, malicious ASNs, malicious domains, etc.

At (2), the external system sends a request to access the network via the ZTRAS subscription engine.

At (3), using the updated threat feeds, the ZTRAS subscription engine validates whether the incoming request is malicious or not based on parameters such as $ZTRAS_{id}$, $ZTRAS_{nodeid}$, source IP, target hostname, ASN, domain, etc.

At (4), if the request is identified as malicious or illegitimate (malicious IP), the ZTRAS subscription engine sets up rules to monitor new requests from the same source IP and/or to the same destination IP ($ZTRAS_{nodeid}$).

At (5), the ZTRAS subscription engine configures the rules in the ZTRAS logging system to monitor the new incoming requests from the external system to the ZTRAS subscription engine.

At (6), the ZTRAS logging system returns the acknowledgement for configuring the rules to the ZTRAS subscription engine.

At (7), the ZTRAS logging system sends alerts back to the ZTRAS subscription engine when suspicious activity is detected based on the rules defined by the ZTRAS subscription engine.

At (8), the ZTRAS subscription engine sends a notification for detection of new requests from the malicious external system to the administrator. the security administrator, operations team and/or the vulnerable target node's administrator.

Use Case 9: Administrative Change Request Management Using ZTRAS

Figure 11:
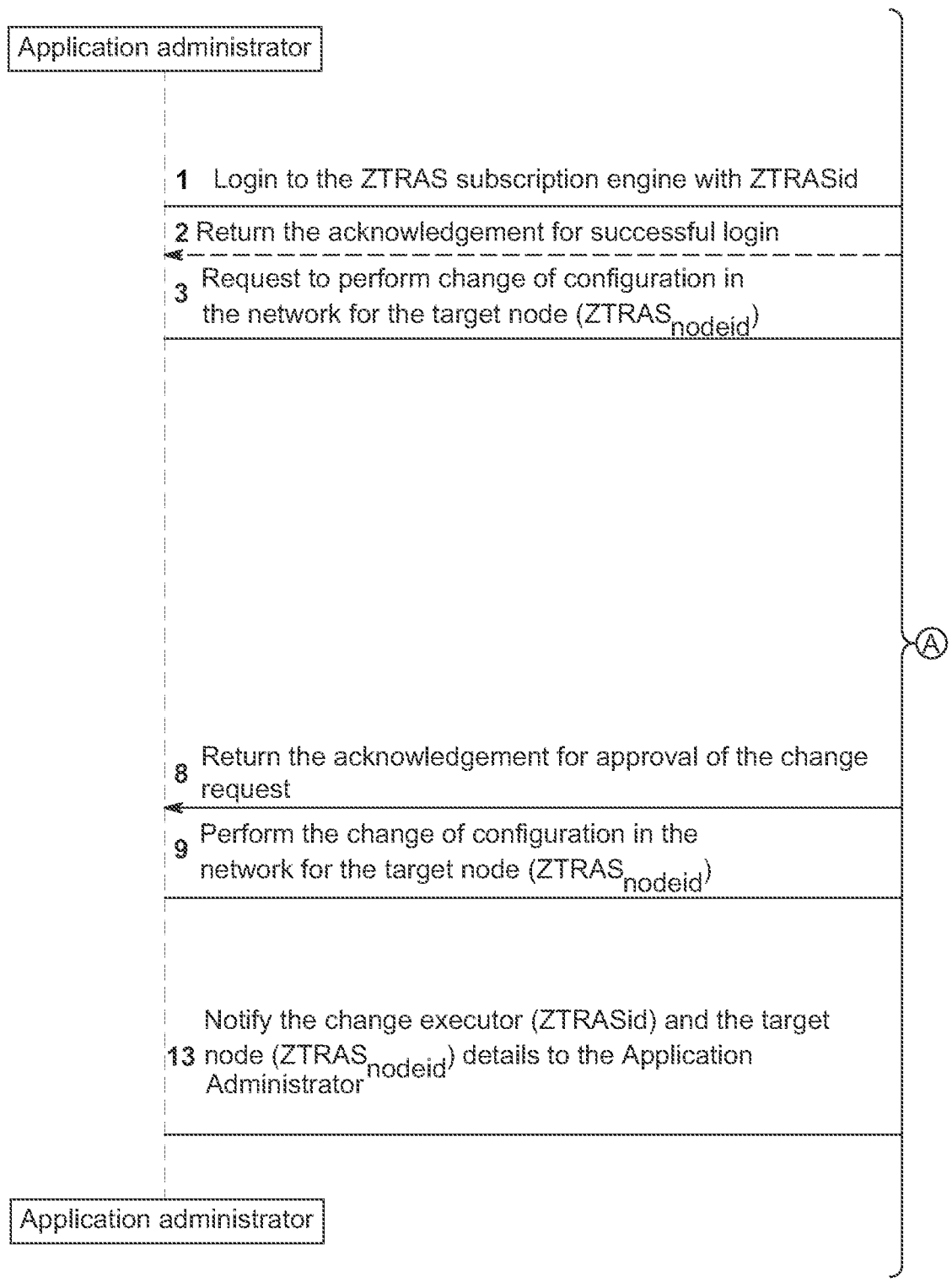
FIG. 11 illustrates a call flow for administrative change request management in the network using ZTRAS, according to an embodiment.
Figure 11:
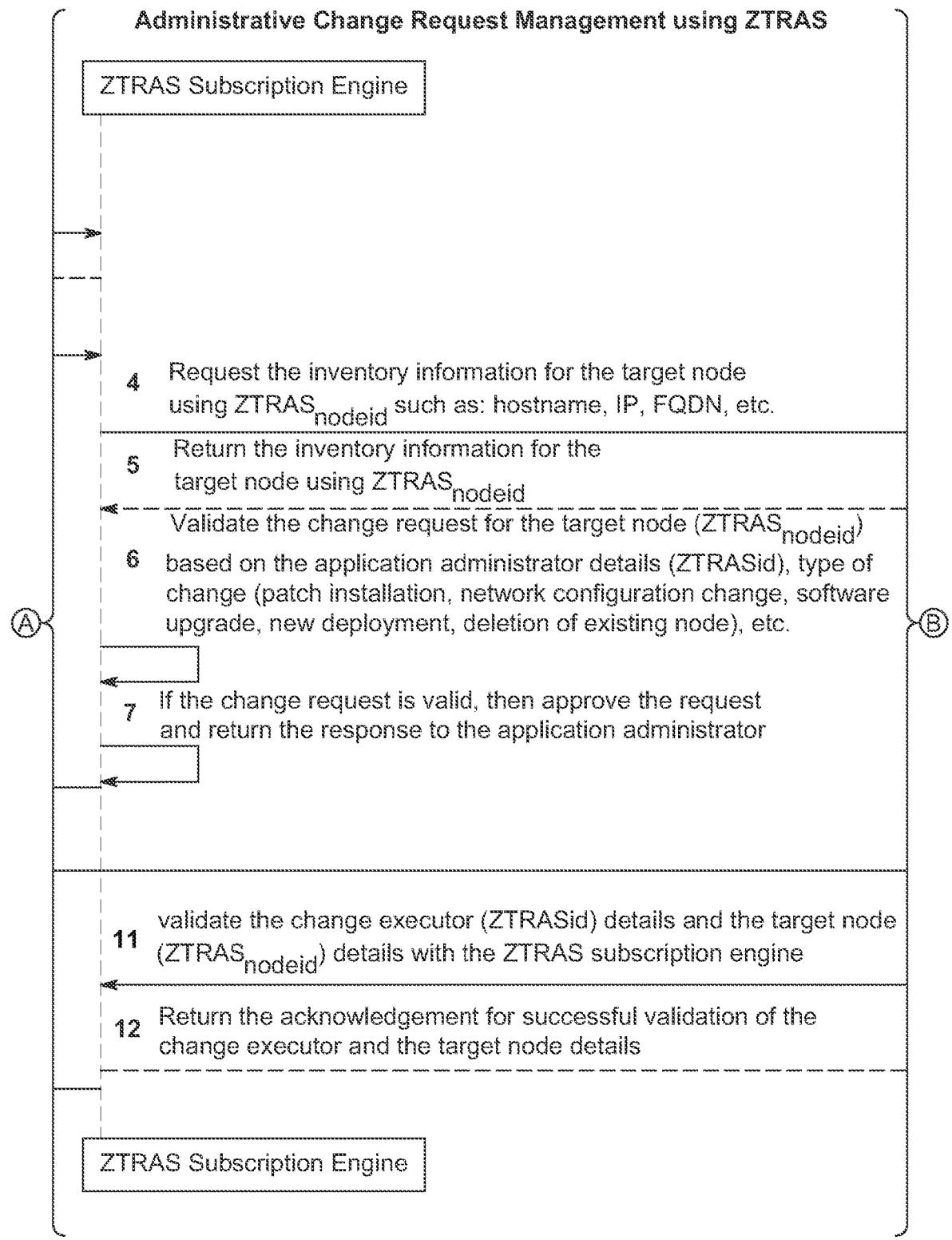
Figure 11:
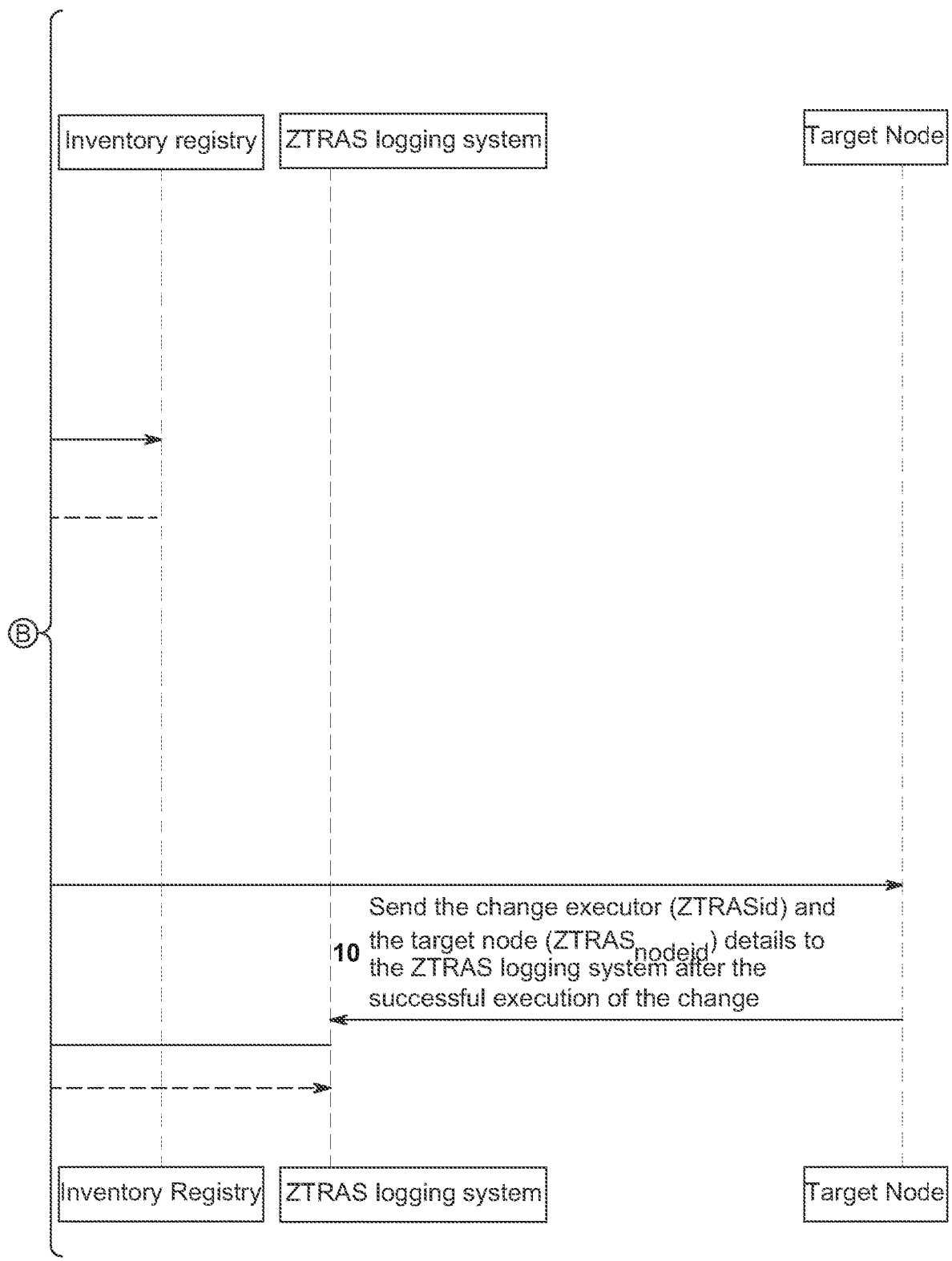

FIG. 11 illustrates a call flow for administrative change request management in the network using ZTRAS, according to an embodiment. In the example of FIG. 11, the application administrator is assumed to have a $ZTRAS_{id}$ and a ZTRAS subscription as a user, and the target node is assumed to have a $ZTRAS_{nodeid}$ in the inventory registry.

Referring to FIG. 11, at (1), the application administrator logs in to the ZTRAS subscription engine with their $ZTRAS_{id}$.

At (2), the ZTRAS subscription engine returns an acknowledgement for successful login to the application administrator.

At (3), the application administrator requests to perform a change of configuration in the network for the target node ($ZTRAS_{nodeid}$).

At (4), the ZTRAS subscription engine requests the inventory registry for the inventory information for the target node using $ZTRAS_{nodeid}$. Here, the request may be for parameters such as hostname, IP, FQDN, etc.

At (5), the inventory registry returns the inventory information for the target node using the $ZTRAS_{nodeid}$.

At (6), the ZTRAS subscription engine validates the change request for the target node ($ZTRAS_{nodeid}$) based on the application administrator details ($ZTRAS_{id}$) and the type of change such as patch installation, network configuration change, software upgrade, new deployment, deletion of existing node, etc.

At (7), if the change request is valid, the ZTRAS subscription engine approves the request.

At (8), the ZTRAS subscription engine returns the acknowledgement for approval of the change request to the application administrator.

At (9), the application administrator performs the change of configuration in the network for the target node ($ZTRAS_{nodeid}$).

At (10), the target node sends the change executor details ($ZTRAS_{id}$) and the target node details ($ZTRAS_{nodeid}$) to the ZTRAS logging system after the successful execution of the change.

At (11), the ZTRAS logging system sends the change executor ($ZTRAS_{id}$) details and the target node ($ZTRAS_{nodeid}$) details to the ZTRAS subscription engine for validation.

At (12), the ZTRAS subscription engine returns the acknowledgement upon successful validation of the change executor details and the target node details.

At (13), the ZTRAS subscription engine notifies the change executor details ($ZTRAS_{id}$) and the target node ($ZTRAS_{nodeid}$) details to the application administrator.

Use Case 10: Patch Management Using ZTRAS

Figure 12:
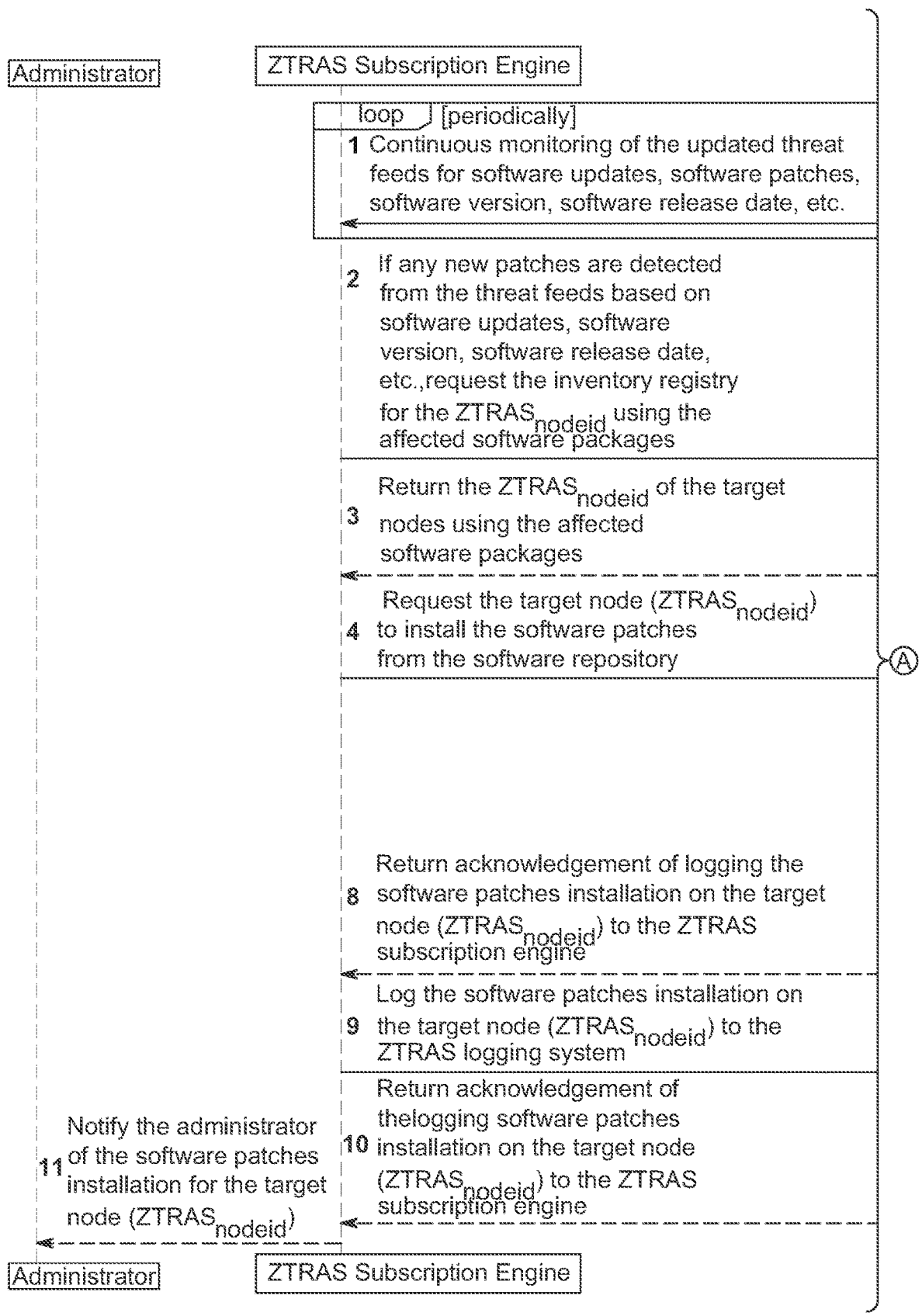
FIG. 12 illustrates a call flow for patch management for trusted nodes in the network using ZTRAS, according to an embodiment.
Figure 12:
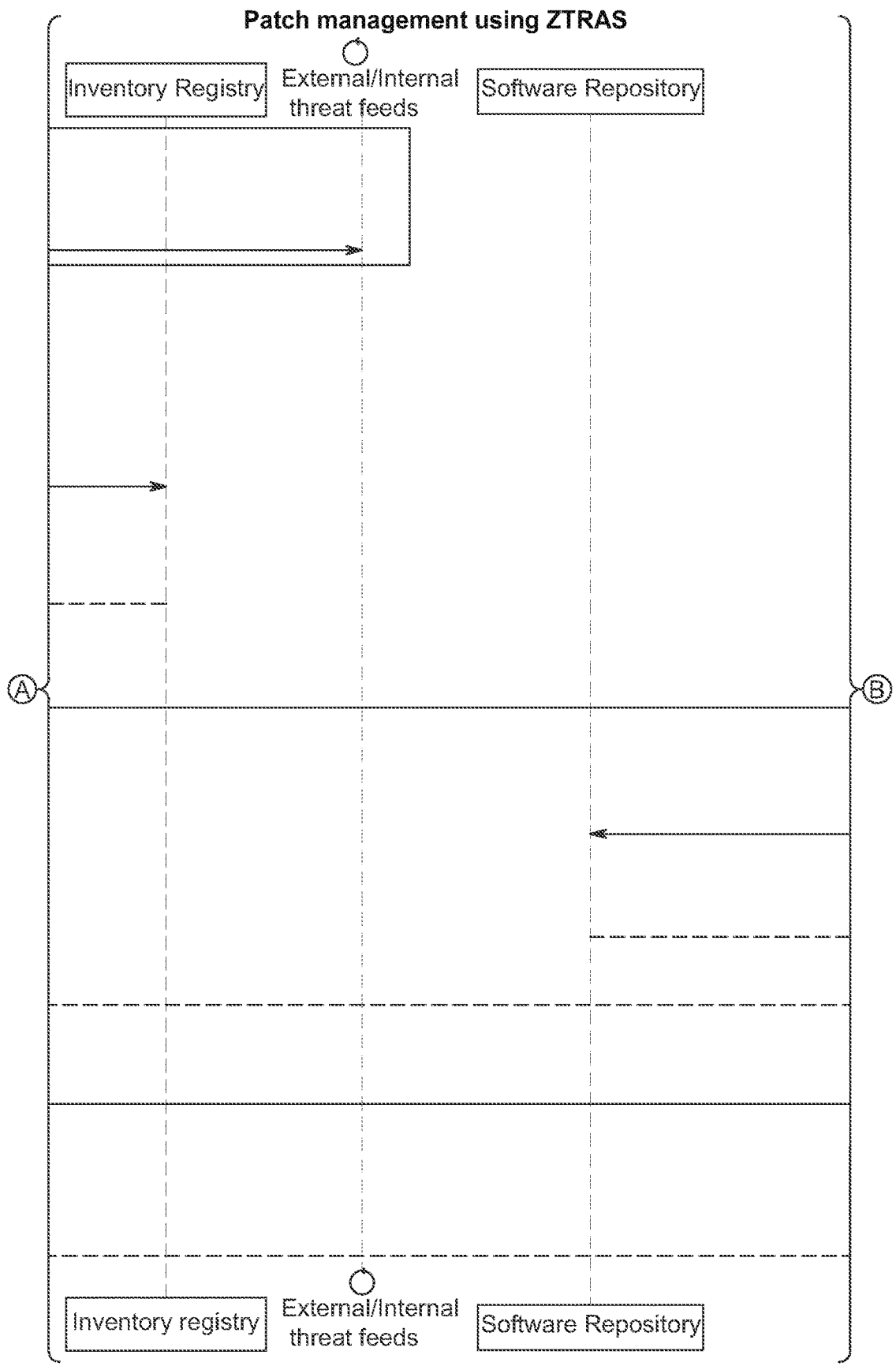
Figure 12:
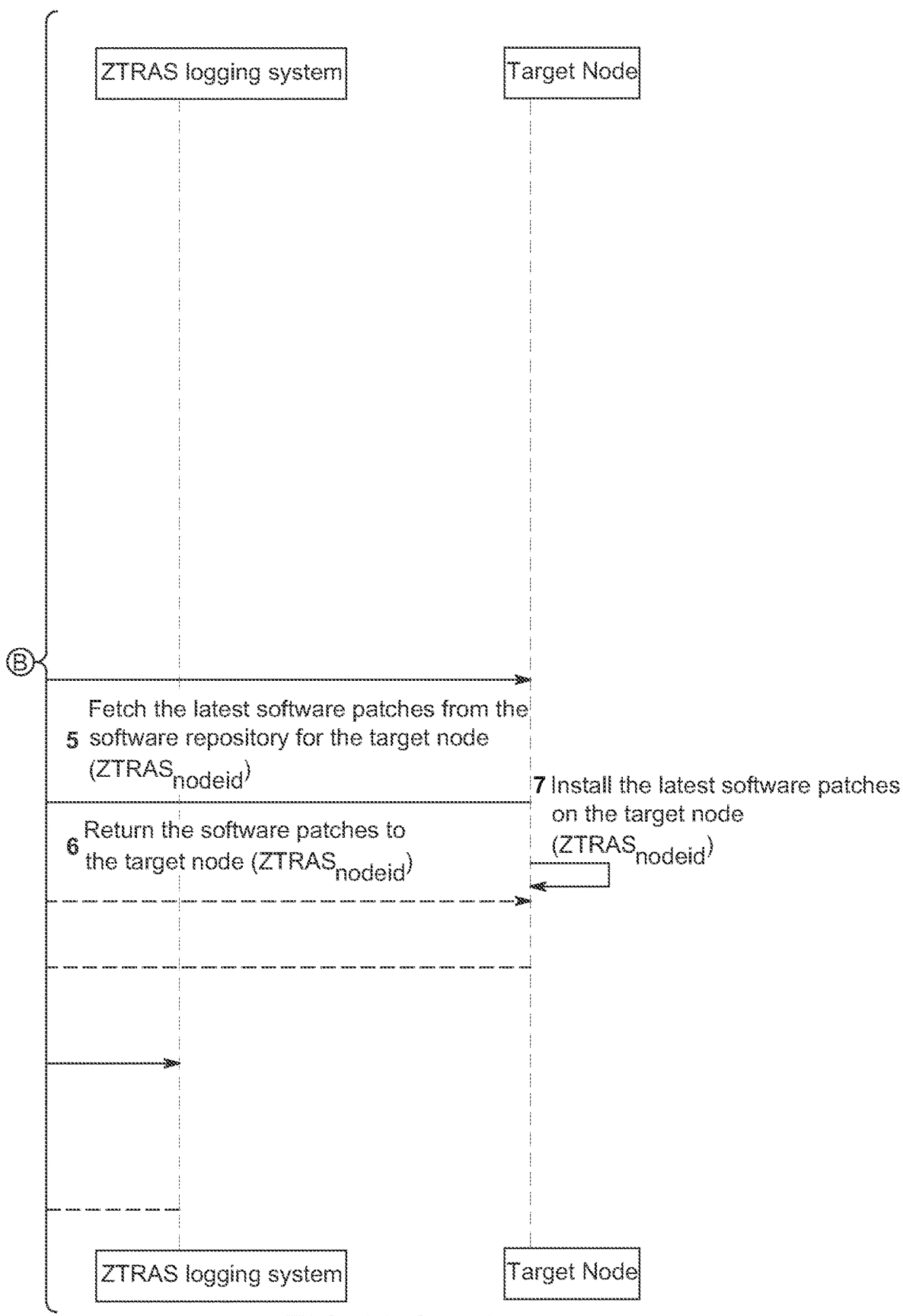

FIG. 12 illustrates a call flow for patch management for trusted nodes in the network using ZTRAS, according to an embodiment. In the example of FIG. 12, it is assumed that the administrator has $ZTRAS_{id}$ and a ZTRAS subscription as a user, and the internal and external threat feeds are assumed to be continuously or periodically updated.

Referring to FIG. 12, at (1), the ZTRAS subscription engine continuously monitors the internal and external threat feeds for software updates, software patches, software version, software release date, etc.

At (2), if any new patches are detected from the threat feeds based on software updates, software version, software release date, etc., the ZTRAS subscription engine requests the inventory registry for the list of $ZTRAS_{nodeid}$ that use the affected software packages.

At (3), the inventory registry returns the $ZTRAS_{nodeid}$ of each target node that uses the affected software packages.

At (4), the ZTRAS subscription engine requests each identified target node ($ZTRAS_{nodeid}$) to install the software patches from the software repository.

At (5), the target node ($ZTRAS_{nodeid}$) requests the software repository to fetch the latest software patches.

At (6), the software repository returns the software patches to the target node ($ZTRAS_{nodeid}$).

At (7), the target node ($ZTRAS_{nodeid}$) installs the latest software patches.

At (8), the target node ($ZTRAS_{nodeid}$) returns an acknowledgement of the software patches installation to the ZTRAS subscription engine.

At (9), the ZTRAS subscription engine send the logs for the software patches installation on the target node ($ZTRAS_{nodeid}$) to the ZTRAS logging system.

At (10), the ZTRAS logging system returns an acknowledgement of logging the software patches installation on the target node ($ZTRAS_{nodeid}$) to the ZTRAS subscription engine.

At (11), the ZTRAS subscription engine notifies the administrator of the software patches installation for the target node ($ZTRAS_{nodeid}$).

Figure 13:
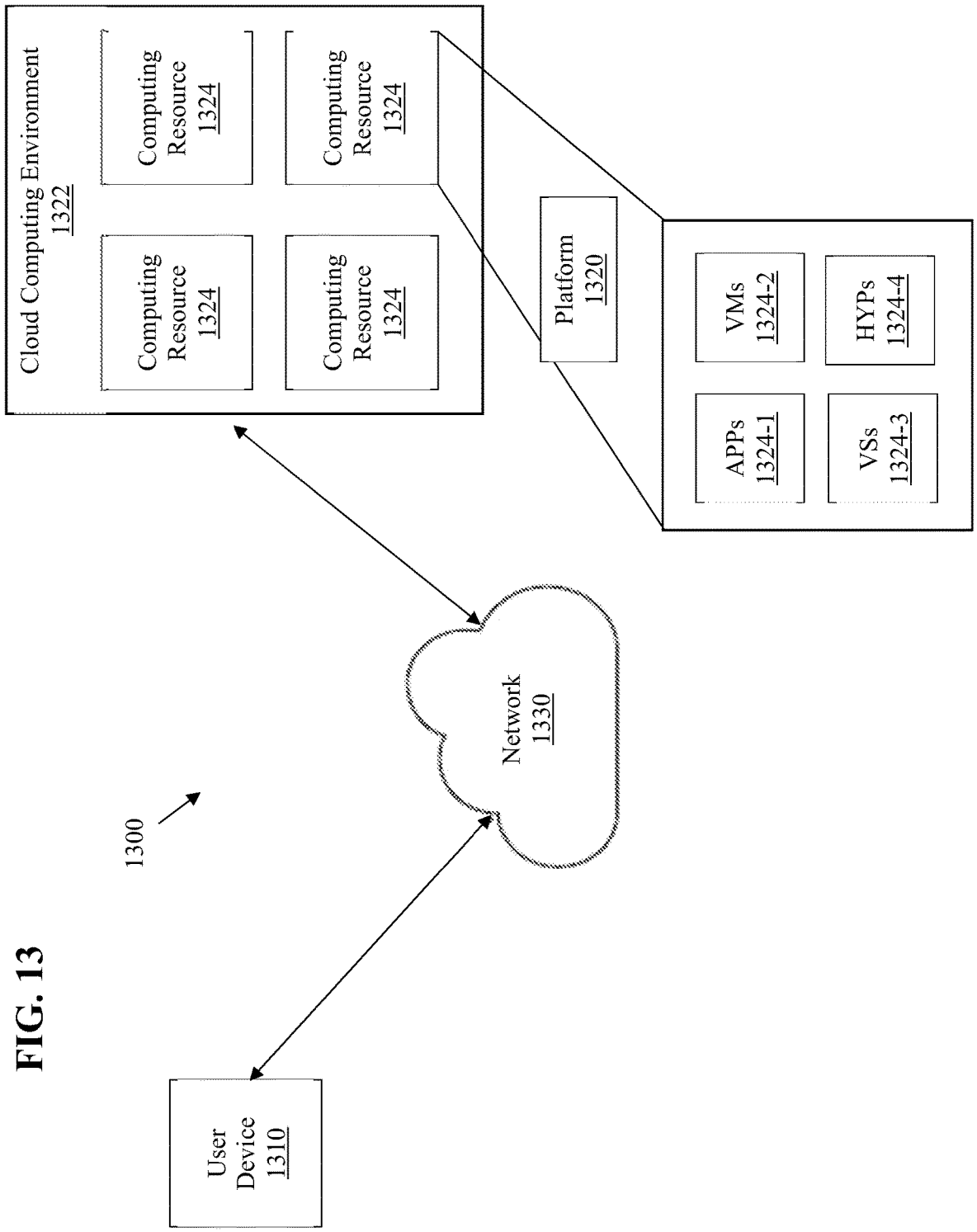
FIG. 13 is a diagram of an example environment in which systems and/or methods, described herein, may be implemented.

FIG. 13 is a diagram of an example environment 1300 in which systems and/or methods, described herein, may be implemented. As shown in FIG. 13, environment 1300 may include a user device 1310, a platform 1320, and a network 1330. Devices of environment 1300 may interconnect via wired connections, wireless connections, or a combination of wired and wireless connections. In embodiments, any of the functions and operations described with reference to FIGS. 1 through 12 above may be performed by any combination of elements illustrated in FIG. 13.

User device 1310 includes one or more devices capable of receiving, generating, storing, processing, and/or providing information associated with platform 1320. For example, user device 1310 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 1310 may receive information from and/or transmit information to platform 1320.

Platform 1320 includes one or more devices capable of receiving, generating, storing, processing, and/or providing information. In some implementations, platform 1320 may include a cloud server or a group of cloud servers. In some implementations, platform 1320 may be designed to be modular such that certain software components may be swapped in or out depending on a particular need. As such, platform 1320 may be easily and/or quickly reconfigured for different uses.

In some implementations, as shown, platform 1320 may be hosted in cloud computing environment 1322. Notably, while implementations described herein describe platform 1320 as being hosted in cloud computing environment 1322, in some implementations, platform 1320 may not be cloud-based (i.e., may be implemented outside of a cloud computing environment) or may be partially cloud-based.

Cloud computing environment 1322 includes an environment that hosts platform 1320. Cloud computing environment 1322 may provide computation, software, data access, storage, etc., services that do not require end-user (e.g., user device 1310) knowledge of a physical location and configuration of system(s) and/or device(s) that hosts platform 1320. As shown, cloud computing environment 1322 may include a group of computing resources 1324 (referred to collectively as "computing resources 1324" and individually as "computing resource 1324").

Computing resource 1324 includes one or more personal computers, a cluster of computing devices, workstation computers, server devices, or other types of computation and/or communication devices. In some implementations, computing resource 1324 may host platform 1320. The cloud resources may include compute instances executing in computing resource 1324, storage devices provided in computing resource 1324, data transfer devices provided by computing resource 1324, etc. In some implementations, computing resource 1324 may communicate with other computing resources 1324 via wired connections, wireless connections, or a combination of wired and wireless connections.

As further shown in FIG. 13, computing resource 1324 includes a group of cloud resources, such as one or more applications ("APPs") 1324-1, one or more virtual machines ("VMs") 1324-2, virtualized storage ("VSs") 1324-3, one or more hypervisors ("HYPs") 1324-4, or the like.

Application 1324-1 includes one or more software applications that may be provided to or accessed by user device 1310. Application 1324-1 may eliminate a need to install and execute the software applications on user device 1310. For example, application 1324-1 may include software associated with platform 1320 and/or any other software capable of being provided via cloud computing environment 1322. In some implementations, one application 1324-1 may send/receive information to/from one or more other applications 1324-1, via virtual machine 1324-2.

Virtual machine 1324-2 includes a software implementation of a machine (e.g., a computer) that executes programs like a physical machine. Virtual machine 1324-2 may be either a system virtual machine or a process virtual machine, depending upon use and degree of correspondence to any real machine by virtual machine 1324-2. A system virtual machine may provide a complete system platform that supports execution of a complete operating system ("OS"). A process virtual machine may execute a single program, and may support a single process. In some implementations, virtual machine 1324-2 may execute on behalf of a user (e.g., user device 1310), and may manage infrastructure of cloud computing environment 1322, such as data management, synchronization, or long-duration data transfers.

Virtualized storage 1324-3 includes one or more storage systems and/or one or more devices that use virtualization techniques within the storage systems or devices of computing resource 1324. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1324-4 may provide hardware virtualization techniques that allow multiple operating systems (e.g., "guest operating systems") to execute concurrently on a host computer, such as computing resource 1324. Hypervisor 1324-4 may present a virtual operating platform to the guest operating systems, and may manage the execution of the guest operating systems. Multiple instances of a variety of operating systems may share virtualized hardware resources.

Network 1330 includes one or more wired and/or wireless networks. For example, network 1330 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 13 are provided as an example. In practice, there may be additional devices and/or networks, fewer devices and/or networks, different devices and/or networks, or differently arranged devices and/or networks than those shown in FIG. 13. Furthermore, two or more devices shown in FIG. 13 may be implemented within a single device, or a single device shown in FIG. 13 may be implemented as multiple, distributed devices. Additionally, or alternatively, a set of devices (e.g., one or more devices) of environment 1300 may perform one or more functions described as being performed by another set of devices of environment 1300.

Figure 14:
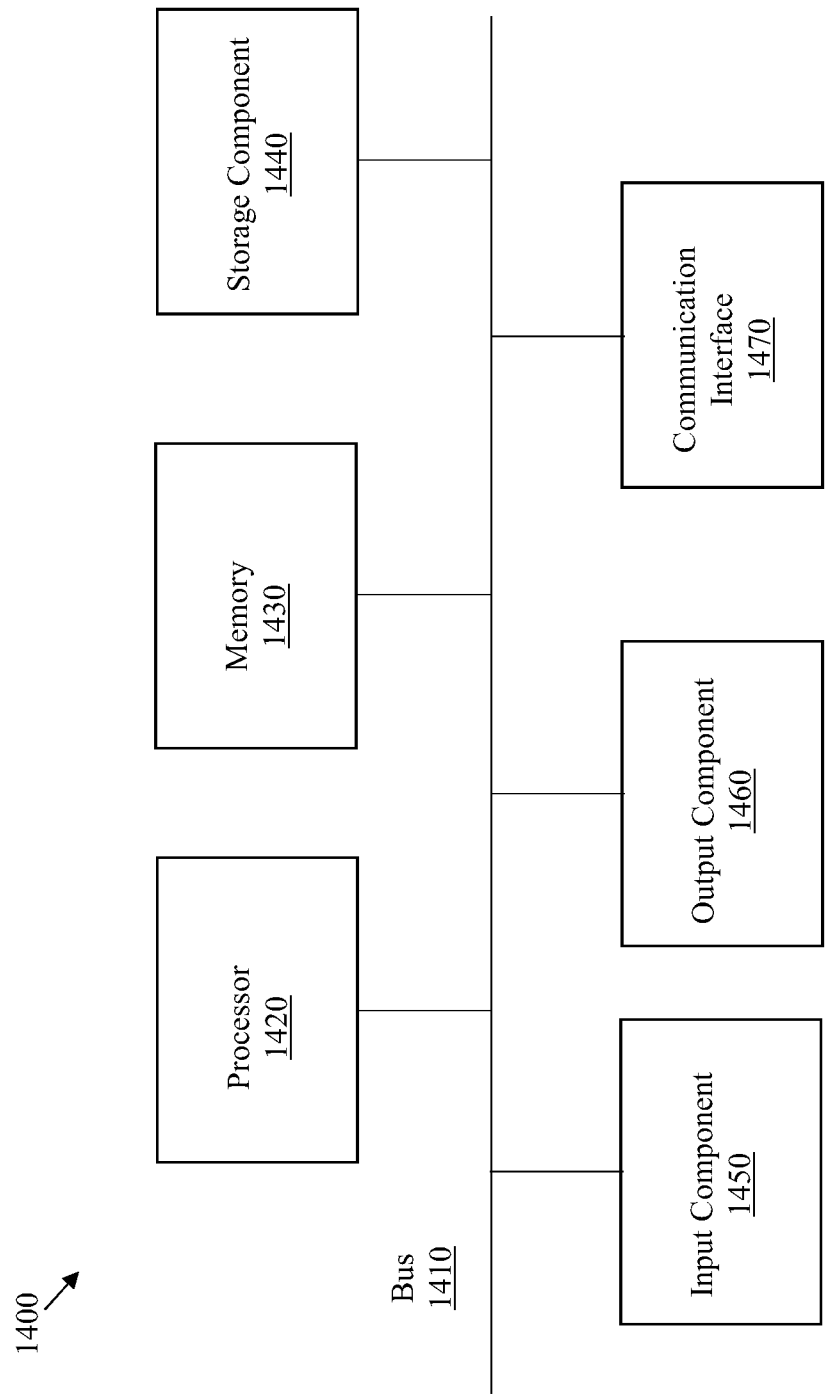
FIG. 14 is a diagram of example components of a device according to an embodiment.

FIG. 14 is a diagram of example components of a device 1400. Device 1400 may correspond to user device 1310 and/or platform 1320. As shown in FIG. 14, device 1400 may include a bus 1410, a processor 1420, a memory 1430, a storage component 1440, an input component 1450, an output component 1460, and a communication interface 1470.

Bus 1410 includes a component that permits communication among the components of device 1400. Processor 1420 may be implemented in hardware, firmware, or a combination of hardware and software. Processor 1420 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1420 includes one or more processors capable of being programmed to perform a function. Memory 1430 includes a random access memory (RAM), a read only memory (ROM), and/or another type of dynamic or static storage device (e.g., a flash memory, a magnetic memory, and/or an optical memory) that stores information and/or instructions for use by processor 1420.

Storage component 1440 stores information and/or software related to the operation and use of device 1400. For example, storage component 1440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1450 includes a component that permits device 1400 to receive information, such as via user input (e.g., a touch screen display, a keyboard, a keypad, a mouse, a button, a switch, and/or a microphone). Additionally, or alternatively, input component 1450 may include a sensor for sensing information (e.g., a global positioning system (GPS) component, an accelerometer, a gyroscope, and/or an actuator). Output component 1460 includes a component that provides output information from device 1400 (e.g., a display, a speaker, and/or one or more light-emitting diodes (LEDs)).

Communication interface 1470 includes a transceiver-like component (e.g., a transceiver and/or a separate receiver and transmitter) that enables device 1400 to communicate with other devices, such as via a wired connection, a wireless connection, or a combination of wired and wireless connections. Communication interface 1470 may permit device 1400 to receive information from another device and/or provide information to another device. For example, communication interface 1470 may include an Ethernet interface, an optical interface, a coaxial interface, an infrared interface, a radio frequency (RF) interface, a universal serial bus (USB) interface, a Wi-Fi interface, a cellular network interface, or the like.

Device 1400 may perform one or more processes described herein. Device 1400 may perform these processes in response to processor 1420 executing software instructions stored by a non-transitory computer-readable medium, such as memory 1430 and/or storage component 1440. A computer-readable medium is defined herein as a non-transitory memory device. A memory device includes memory space within a single physical storage device or memory space spread across multiple physical storage devices.

Software instructions may be read into memory 1430 and/or storage component 1440 from another computer-readable medium or from another device via communication interface 1470. When executed, software instructions stored in memory 1430 and/or storage component 1440 may cause processor 1420 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 14 are provided as an example. In practice, device 1400 may include additional components, fewer components, different components, or differently arranged components than those shown in FIG. 14. Additionally, or alternatively, a set of components (e.g., one or more components) of device 1400 may perform one or more functions described as being performed by another set of components of device 1400.

In embodiments, any one of the operations or processes of FIGS. 1 through 12 and 15 through 18 may be implemented by or using any one of the elements illustrated in FIGS. 13 and 14. It is understood that other embodiments are not limited thereto, and may be implemented in a variety of different architectures (e.g., bare metal architecture, any cloud-based architecture or deployment architecture such as Kubernetes, Docker, OpenStack, etc.).

Figure 15:
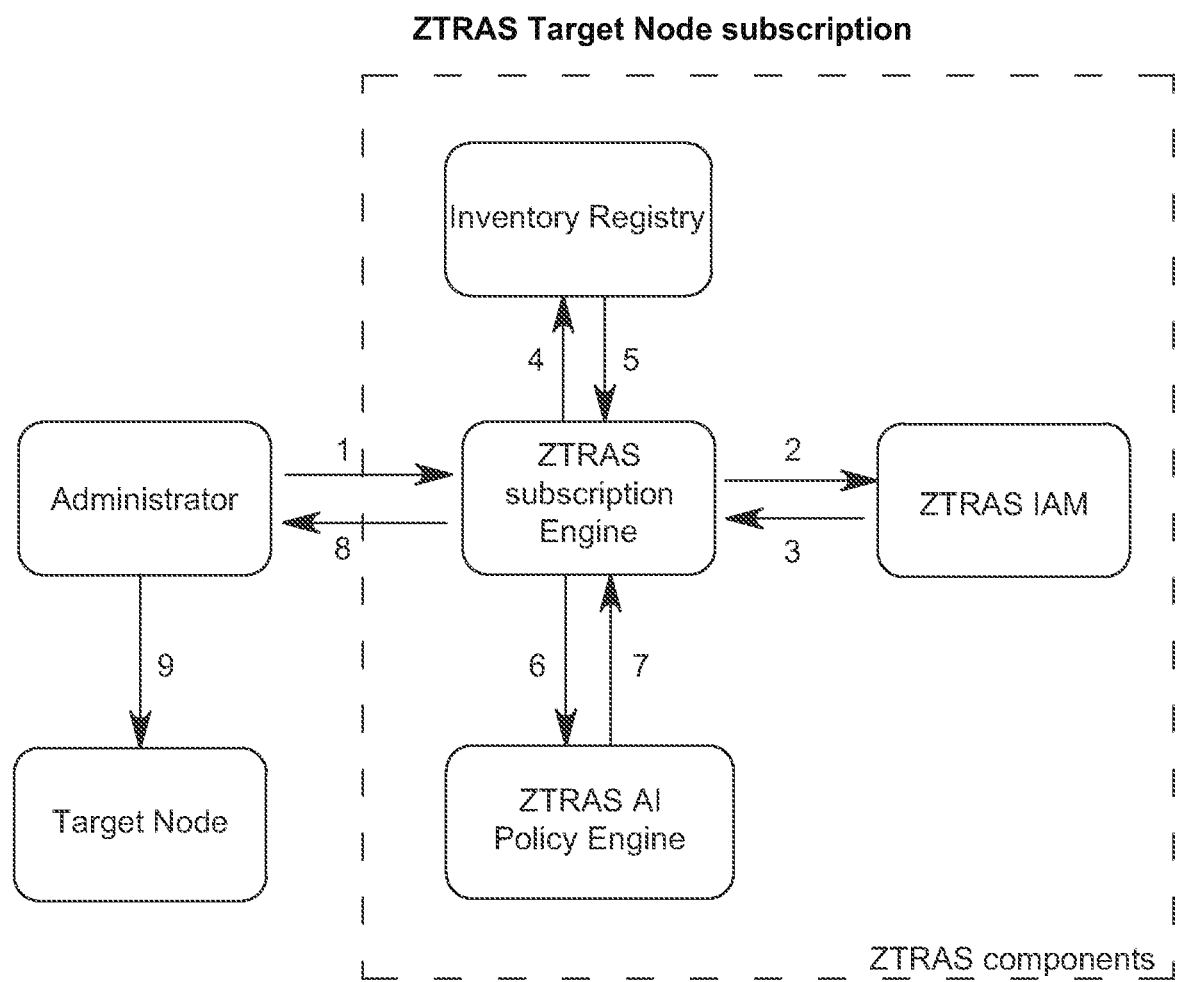
FIG. 15 illustrates a block diagram of a communication flow for subscribing a target node in a ZTRAS according to an embodiment.

FIG. 15 illustrates a block diagram of a communication flow for subscribing a target node in a ZTRAS according to an embodiment. Referring to FIG. 15, at (1), a user (e.g., a user with administrator privileges) submits a subscription request to the ZTRAS subscription engine to subscribe a target node in the ZTRAS. At (2), the ZTRAS subscription engine sends the registration request to the ZTRAS IAM for registering the target node. In this regard, the ZTRAS subscription engine provides the ZTRAS IAM with parameters for generating a $ZTRAS_{id}$ for the target node (e.g., ip, fqdn, uuid, Tnode name, loc, proto, tz, Tnode type, prg, ts, res_seg). At (3), upon successful registration of the target node, including generation of the $ZTRAS_{id}$ for the target node, the ZTRAS IAM returns the generated $ZTRAS_{id}$ to the ZTRAS subscription engine.

At (4), the ZTRAS subscription engine updates the inventory registry with the target node subscription details and the $ZTRAS_{id}$, and at (5) the inventory registry returns an acknowledgment of updating the details and $ZTRAS_{id}$ in the inventory registry.

At (6), the ZTRAS subscription engine sends the $ZTRAS_{id}$ and target node subscription details to the AI policy engine for calculation of a trust percentage, and at (7) the AI policy engine returns the calculated trust percentage to the ZTRAS subscription engine.

At (8), the ZTRAS subscription engine acknowledges successful target node subscription to the administrator and provides target node configuration parameters to the administrator. At (9), the target node is configured with the ZTRAS node configuration parameters.

Figure 16:
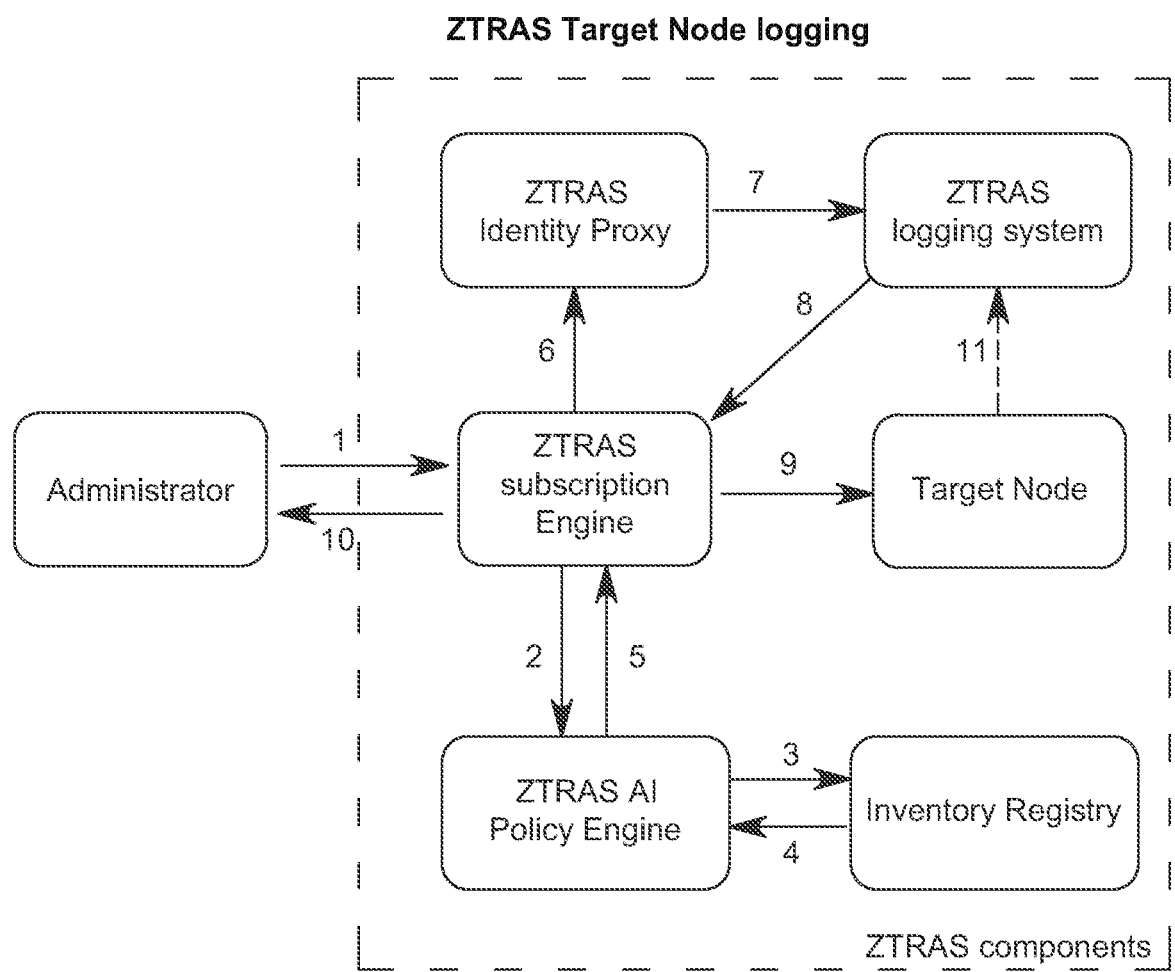
FIG. 16 illustrates a block diagram of a communication flow for registering a target node for security and audit logging in a ZTRAS according to an embodiment.

FIG. 16 illustrates a block diagram of a communication flow for registering a target node for security and audit logging in a ZTRAS according to an embodiment. Referring to FIG. 16, at (1), a user (e.g., a user with administrator privileges) sends a request for service initialization and/or target node logging integration to the ZTRAS subscription engine. Based on the request (e.g., the request for service node initialization), the ZTRAS subscription engine requests the AI policy engine to calculate a trust percentage for the target node. The AI policy engine, in turn, requests the inventory registry for target node details based on the $ZTRAS_{id}$ of the target node at (3). The inventory registry then provides the AI policy engine with the target node details corresponding to the $ZTRAS_{id}$ of the target node at (4), and the AI policy engine calculates the trust percentage based on the details at (5).

At (6), the ZTRAS subscription engine sends a target node logging registration request to the ZTRAS identity proxy. For example, based on the trust percentage being below a threshold value due to no security logging being registered or integrated in the target node, the target node service is not initialized and the ZTRAS subscription engine requests the logging registration. At (7), the ZTRAS identity proxy forwards or sends the target node logging registration request to the ZTRAS logging system. At (8), the ZTRAS logging system acknowledges the registration request with target node configuration parameters for logging to the ZTRAS subscription engine. At (9), the ZTRAS subscription engine configures the target node with the parameters provided by the ZTRAS logging system. At (10), the successful integration of the target node with the logging system is acknowledged, and the administrator is notified. At (11), the target node having been configured with security and audit log integration sends security and audit logs to the ZTRAS logging system accordingly.

According to an embodiment, based on the target node being configured with the security and audit logging, the trust percentage of the target node may be calculated (or re-calculated) to initiate service of the target node. For example, the user may re-request service initialization of the target node, and based on the trust percentage being greater than a predetermined threshold (e.g., as a result of the security and audit log registration), the service of the target node may be initialized.

Figure 17:
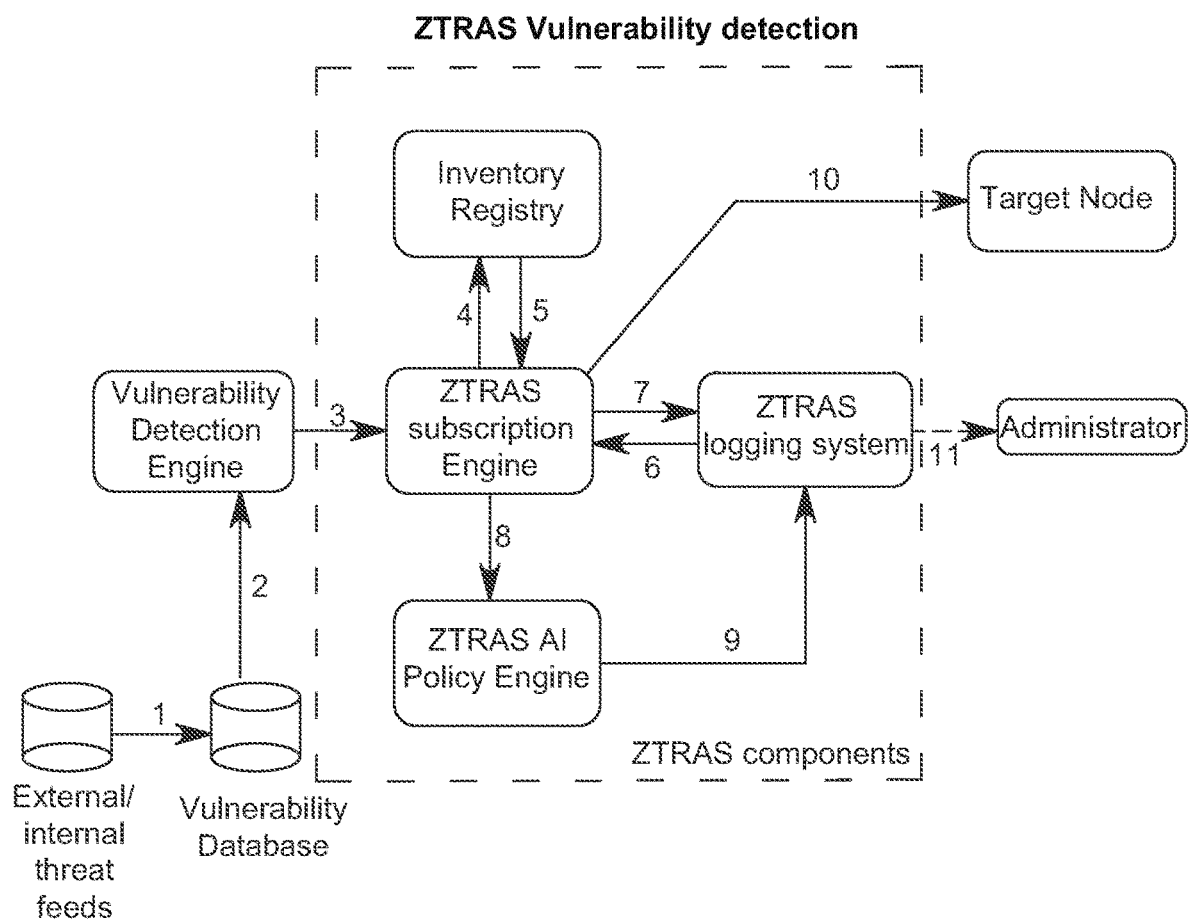
FIG. 17 illustrates a block diagram of a communication flow for vulnerability detection in a ZTRAS according to an embodiment.

FIG. 17 illustrates a block diagram of a communication flow for vulnerability detection in a ZTRAS according to an embodiment. Referring to FIG. 17, at (1), the latest threat feeds are fetched from internal external sources and stored in the internal vulnerability database. The latest thread feeds may include, for example, the following attributes: CVE-ID, CVSS score, Severity, CWE-ID, vulnerable packages, mitigation, exploits, patch, etc.

At (2), alerts for new vulnerabilities are sent (e.g., via push or pull) to the vulnerability detection engine. For example, the vulnerability detection engine may periodically or continuously check the internal vulnerability database for new vulnerabilities.

At (3), the vulnerability detection engine notifies the ZTRAS subscription engine (e.g., periodically) of vulnerabilities based on, for example, the severity of the vulnerability. For example, the vulnerability detection engine may send the latest list every hour if the CVSS score is greater than 8.0, every six hours if the CVSS score is greater than 5.0 and less than 8.0, and every 12 hours if the CVSS score is less than 5.0.

At (4), the ZTRAS subscription engine looks up one or more $ZTRAS_{nodeid}$ from the inventory registry that match the notification. At (5), the inventory registry returns the $ZTRAS_{nodeid}$ that match the lookup criteria, e.g., based on query parameters such as software name, software_version, os_version, os_type, os_arch, os_family, etc., corresponding to parameters of the notification or threat feed.

At (6), the ZTRAS subscription engine queries the ZTRAS logging system for logs of the target node corresponding to the $ZTRAS_{nodeid}$. At (7), the ZTRAS logging system returns the ZTRAS vulnerability report for the vulnerable node using the $ZTRAS_{nodeid}$.

At (8), the ZTRAS subscription engine requests the ZTRAS AI policy engine to set up monitoring rules for the target node, and at (9) the ZTRAS AI policy engine configures the rules for detection of events based on the vulnerability report in the ZTRAS logging system.

At (10), the ZTRAS subscription engine sets up a watchdog for monitoring the health status of the vulnerable target node (e.g., for a duration defined in the rules). At (11), the ZTRAS logging system notifies the user (e.g., administrator) of detected vulnerabilities based on the configured rules.

Figure 18:
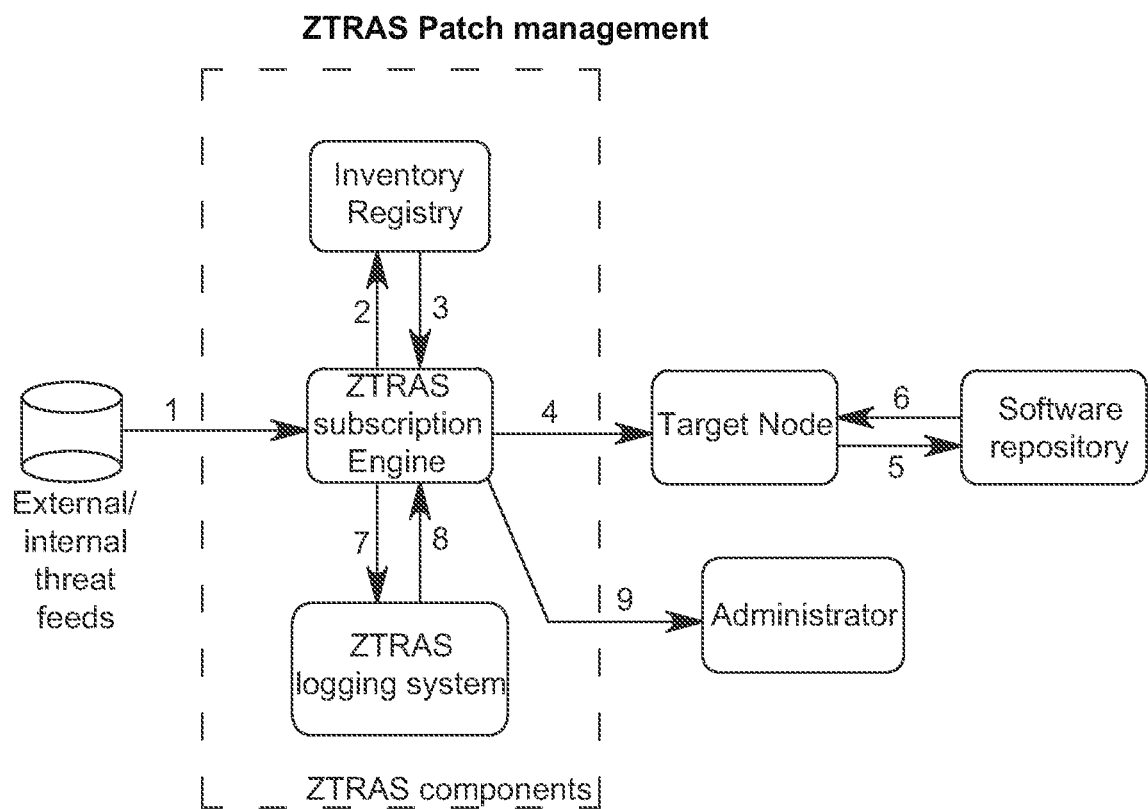
FIG. 18 illustrates a block diagram of a communication flow for updating software of a target node in a ZTRAS according to an embodiment.

FIG. 18 illustrates a block diagram of a communication flow for updating software of a target node in a ZTRAS according to an embodiment. Referring to FIG. 18, at (1), the ZTRAS subscription engine obtains updates of threat feeds for new software updates, patches, etc.

At (2), if any new patches are detected from the threat feeds based on software updates, software_version, software release date, etc., the ZTRAS subscription engine requests the inventory registry for the list of $ZTRAS_{nodeid}$ that use the affected software packages.

At (3), the inventory registry returns the $ZTRAS_{nodeid}$ of each target node that uses the affected software packages, i.e., based on the lookup criteria, to the ZTRAS subscription engine.

At (4), the ZTRAS subscription engine requests each identified target node ($ZTRAS_{nodeid}$) to install the software patches from the software repository.

At (5), the target node ($ZTRAS_{nodeid}$) requests the software repository to fetch the latest software patches.

At (6), the software repository returns the software patches to the target node ($ZTRAS_{nodeid}$).

At (7), based on the target node ($ZTRAS_{nodeid}$) installing the latest software patches, the ZTRAS subscription engine logs the installation of the software patches to the ZTRAS logging system.

At (8), the ZTRAS logging system returns an acknowledgement of the logging of the patch installation on the target node.

At (9), the ZTRAS subscription engine notifies the administrator of the software patches installation on the target node ($ZTRAS_{nodeid}$).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of registering a node for zero trust remote access in a network system, the method comprising:
   receiving a request to subscribe a node to a zero trust remote access system (ZTRAS) for a network;
   generating a ZTRAS subscribed subscription identification (ID) for the node based on one or more parameters of the node, to thereby provide a ZTRAS subscribed node, wherein the ZTRAS subscribed subscription identification comprises an indication of a type of the node;
   configuring the ZTRAS subscribed node with security logging based on ZTRAS subscription, wherein the configuring the ZTRAS subscribed node with security logging comprises:
      calculating a first trust percentage for the ZTRAS subscribed node,
      based on the first trust percentage being less than a threshold value, rejecting service initialization of the ZTRAS subscribed node,
      based on a request to configure the ZTRAS subscribed node with security logging, configuring the ZTRAS subscribed node with security logging based on the request, and
      calculating a second trust percentage for the ZTRAS subscribed node based on the configured security logging;

initiating a service of the ZTRAS subscribed node based on a trust percentage calculated for the ZTRAS subscribed node according to a security configuration of the node; and receiving logs from the ZTRAS subscribed node based on the configured security logging, wherein the logs are received at a frequency based on the type of the node, wherein the logs comprise at least one of security, audit, authentication, and authorization logs.

2. The method as claimed in claim 1, wherein the initiating the service of the ZTRAS subscribed node comprises initiating the service based on determining that the second trust percentage is greater than the threshold value.

3. The method as claimed in claim 1, wherein the receiving the logs from the ZTRAS subscribed node comprises:
obtaining information on a vulnerability;
identifying the ZTRAS subscribed node as susceptible to the vulnerability based on one or more parameters of the ZTRAS subscribed node corresponding to the obtained information on the vulnerability;
monitoring incoming and/or outgoing traffic in the received logs of the ZTRAS subscribed node for a predetermined duration based on a severity of the vulnerability; and
based on detecting the vulnerability in the logs, outputting an alert.

4. The method as claimed in claim 3, wherein the monitoring comprises configuring one or more rules, including the predetermined duration, for detecting one or more events corresponding to the vulnerability in the received logs.

5. The method as claimed in claim 3, further comprising setting up a watchdog for security monitoring of the ZTRAS subscribed node for the predetermined duration.

6. The method as claimed in claim 3, wherein the identifying the ZTRAS subscribed node as vulnerable comprises querying an inventory registry, in which subscription IDs and parameters for registered nodes in the system are stored, for subscription ids having the one or more parameters that correspond to the obtained information on the vulnerability.

7. The method as claimed in claim 1, wherein the type of the node comprises a terminal node, application node, and a radio node, wherein the terminal node comprises any node that allows access through Transmission Control Protocol (TCP) connections, wherein the application node comprises any node that allows access through HyperText Transfer Protocol (HTTP)/HyperText Transfer Protocol Secure (HTTPS) connections, and wherein the radio node comprises any node that is part of a Radio Access Network (RAN).

8. A zero trust remote access system for configuring nodes for zero trust access in a network, the system comprising:
at least one memory storing instructions; and
at least one processor configured to execute the instructions to:
receive a request to subscribe a node to a zero trust remote access system for a network,
generate a ZTRAS subscription identification (ID) for the node based on one or more parameters of the node, to thereby provide a ZTRAS subscribed node, wherein the ZTRAS subscription identification comprises an indication of a type of the node,
configure the ZTRAS subscribed node with security logging based on ZTRAS subscription,
initiate a service of the ZTRAS subscribed node based on a trust percentage calculated for the ZTRAS subscribed node according to a security configuration of the node, and
receive logs from the ZTRAS subscribed node based on the configured security logging, wherein the logs are received at a frequency based on the type of the node,
wherein the logs comprise at least one of security, audit, authentication, and authorization logs, and
wherein the at least one processor is configured to execute the instructions to:
calculate a first trust percentage for the ZTRAS subscribed node;
based on the first trust percentage being less than a threshold value, reject service initialization of the ZTRAS subscribed node;
based on a request to configure the ZTRAS subscribed node with security logging, configure the ZTRAS subscribed node with security logging; and
calculate a second trust percentage for the ZTRAS subscribed node based on the configured security logging.

9. The zero trust remote access system as claimed in claim 8, wherein the at least one processor is configured to execute the instructions to initiate the service based on determining that the second trust percentage is greater than the threshold value.

10. The zero trust remote access system as claimed in claim 8, wherein the at least one processor is configured to execute the instructions to:
obtain information on a vulnerability;
identify the ZTRAS subscribed node as vulnerable based on one or more parameters of the ZTRAS subscribed node corresponding to the obtained information on the vulnerability;
monitor incoming and/or outgoing traffic in the received logs of the ZTRAS subscribed node for a predetermined duration based on a severity of the vulnerability; and
based on detecting the vulnerability in the logs, output an alert.

11. The zero trust remote access system as claimed in claim 10, wherein the at least one processor is configured to execute the instructions to configure one or more rules, including the predetermined duration, for detecting one or more events corresponding to the vulnerability in the received logs.

12. The zero trust remote access system as claimed in claim 10, the at least one processor is configured to execute the instructions to set up a watchdog for security monitoring of the ZTRAS subscribed node for the predetermined duration.

13. The zero trust remote access system as claimed in claim 10, wherein the at least one processor is configured to execute the instructions to identify the ZTRAS subscribed node as vulnerable by querying an inventory registry, in which subscription IDs and parameters for registered nodes in the system are stored, for subscription ids having the one or more parameters that correspond to the obtained information on the vulnerability.

14. A non-transitory computer-readable recording medium having recorded thereon instructions executable by at least one processor to perform a method of registering a node for zero trust remote access in a network system, the method comprising:
receiving a request to subscribe a node to a zero trust remote access system for a network;
generating a ZTRAS subscription identification (ID) for the node based on one or more parameters of the node, to thereby provide a ZTRAS subscribed node, wherein the ZTRAS subscription identification comprises an indication of a type of the node;
configuring the ZTRAS subscribed node with security logging based on ZTRAS subscription, wherein the configuring the ZTRAS subscribed node with security logging comprises:
 calculating a first trust percentage for the ZTRAS subscribed node,
 based on the first trust percentage being less than a threshold value, rejecting service initialization of the ZTRAS subscribed node,
 based on a request to configure the ZTRAS subscribed node with security logging, configuring the ZTRAS subscribed node with security logging based on the request, and
 calculating a second trust percentage for the ZTRAS subscribed node based on the configured security logging;
initiating a service of the ZTRAS subscribed node based on a trust percentage calculated for the ZTRAS subscribed node according to a security configuration of the node; and
receiving logs from the ZTRAS subscribed node based on the configured security logging, wherein the logs are received at a frequency based on the type of the node, wherein the logs comprise at least one of security, audit, authentication, and authorization logs.

15. The non-transitory computer-readable recording medium as claimed in claim 14, wherein the initiating the service of the ZTRAS subscribed node comprises initiating the service based on determining that the second trust percentage is greater than the threshold value.

16. The non-transitory computer-readable recording medium as claimed in claim 14, wherein the receiving the logs from the ZTRAS subscribed node comprises:
 obtaining information on a vulnerability;
 identifying the node as vulnerable based on one or more parameters of the ZTRAS subscribed node corresponding to the obtained information on the vulnerability;
 monitoring incoming and/or outgoing traffic in the received logs of the ZTRAS subscribed node for a predetermined duration based on a severity of the vulnerability; and
 based on detecting the vulnerability in the logs, outputting an alert.

17. The non-transitory computer-readable recording medium as claimed in claim 16, wherein the monitoring comprises configuring one or more rules, including the predetermined duration, for detecting one or more events corresponding to the vulnerability in the received logs.

18. The non-transitory computer-readable recording medium as claimed in claim 16, further comprising setting up a watchdog for security monitoring of the ZTRAS subscribed node for the predetermined duration.

* * * * *